United States Patent
Emmanuel et al.

(10) Patent No.: US 10,192,416 B2
(45) Date of Patent: Jan. 29, 2019

(54) INDOOR POSITIONING AND TRACKING USING A MULTI-BAND WIRELESS NETWORKING SYSTEM

(71) Applicant: NETGEAR, INC., San Jose, CA (US)

(72) Inventors: Joseph Amalan Arul Emmanuel, Cupertino, CA (US); Peiman Amini, Mountain View, CA (US)

(73) Assignee: NETGEAR, INC., San Jose, CA (US)

( * ) Notice: Subject to any disclaimer, the term of this patent is extended or adjusted under 35 U.S.C. 154(b) by 0 days.

(21) Appl. No.: 15/632,117

(22) Filed: Jun. 23, 2017

(65) Prior Publication Data

US 2018/0103351 A1    Apr. 12, 2018

Related U.S. Application Data

(60) Provisional application No. 62/406,325, filed on Oct. 10, 2016.

(51) Int. Cl.
*H04W 4/02* (2018.01)
*G08B 13/22* (2006.01)
(Continued)

(52) U.S. Cl.
CPC ............ *G08B 13/22* (2013.01); *G01S 5/0289* (2013.01); *G01S 5/0294* (2013.01); *G01S 19/46* (2013.01); *G08B 13/2494* (2013.01); *H04B 1/005* (2013.01); *H04B 1/713* (2013.01); *H04B 17/0085* (2013.01); *H04B 17/345* (2015.01); *H04L 5/003* (2013.01); *H04L 12/4633* (2013.01); *H04L 41/12* (2013.01); *H04L 43/08* (2013.01); *H04L 43/0864* (2013.01); *H04L 43/0888* (2013.01); *H04L 43/16* (2013.01); *H04L 45/02* (2013.01); *H04L 67/303* (2013.01); *H04L 67/42* (2013.01); *H04L 69/22* (2013.01); *H04W 4/02* (2013.01); *H04W 4/029* (2018.02); *H04W 4/04* (2013.01); *H04W 4/70* (2018.02);
(Continued)

(58) Field of Classification Search
CPC ......... H04W 4/04; H04W 4/02; H04W 64/00; H04W 64/003
USPC ..................... 455/456.1, 456.2, 456.4, 456.6
See application file for complete search history.

(56) References Cited

U.S. PATENT DOCUMENTS

| 7,248,574 B2 | 7/2007 | Backes et al. |
| 2007/0142050 A1 | 6/2007 | Handforth et al. |

(Continued)

FOREIGN PATENT DOCUMENTS

WO        2016064641 A1    4/2016

*Primary Examiner* — Sam Bhattacharya
(74) *Attorney, Agent, or Firm* — Perkins Coie LLP

(57) ABSTRACT

Systems and methods are introduced for indoor positioning and tracking of devices and objects using a multi-band wireless networking system. In an embodiment, multiple wireless networking devices are interconnected via a dedicated wireless backhaul to collectively form a single multi-band wireless network providing broad coverage to a client device. The multiple wireless networking devices of the system are coordinated via the dedicated backhaul, for example to manage time synchronization of signals received from the wireless networking devices that are indicative of a position of a client device or object. By coordinating the wireless networking devices via the dedicated backhaul and applying positioning processes to the received signals, a position of the client device or object is determined.

20 Claims, 18 Drawing Sheets

(51) Int. Cl.

| | | |
|---|---|---|
| H04W 4/029 | (2018.01) | |
| H04W 76/11 | (2018.01) | |
| H04W 16/26 | (2009.01) | |
| H04L 12/26 | (2006.01) | |
| H04L 12/751 | (2013.01) | |
| H04L 29/06 | (2006.01) | |
| H04W 28/02 | (2009.01) | |
| H04W 72/04 | (2009.01) | |
| H04W 84/12 | (2009.01) | |
| H04L 29/08 | (2006.01) | |
| H04W 36/24 | (2009.01) | |
| H04W 36/32 | (2009.01) | |
| H04W 36/38 | (2009.01) | |
| H04W 4/70 | (2018.01) | |
| H04W 4/80 | (2018.01) | |
| H04L 12/46 | (2006.01) | |
| H04B 1/00 | (2006.01) | |
| H04B 1/713 | (2011.01) | |
| H04L 5/00 | (2006.01) | |
| H04W 40/24 | (2009.01) | |
| H04W 80/06 | (2009.01) | |
| H04W 84/04 | (2009.01) | |
| H04W 84/10 | (2009.01) | |
| H04B 17/345 | (2015.01) | |
| H04B 17/00 | (2015.01) | |
| G01S 5/02 | (2010.01) | |
| G01S 19/46 | (2010.01) | |
| H04W 4/04 | (2009.01) | |
| H04W 36/20 | (2009.01) | |
| H04W 72/08 | (2009.01) | |
| H04W 28/04 | (2009.01) | |
| G08B 13/24 | (2006.01) | |
| H04L 12/24 | (2006.01) | |
| H04W 12/08 | (2009.01) | |
| H04W 84/18 | (2009.01) | |
| H04W 48/02 | (2009.01) | |
| H04W 76/15 | (2018.01) | |
| H04B 17/318 | (2015.01) | |
| H04W 88/08 | (2009.01) | |
| H04W 88/10 | (2009.01) | |
| H04W 92/20 | (2009.01) | |
| H04B 1/715 | (2011.01) | |
| H04W 8/00 | (2009.01) | |
| H04W 28/18 | (2009.01) | |
| H04W 72/12 | (2009.01) | |

(52) U.S. Cl.
CPC .............. *H04W 4/80* (2018.02); *H04W 12/08* (2013.01); *H04W 16/26* (2013.01); *H04W 28/0236* (2013.01); *H04W 28/0289* (2013.01); *H04W 28/04* (2013.01); *H04W 36/20* (2013.01); *H04W 36/245* (2013.01); *H04W 36/32* (2013.01); *H04W 36/38* (2013.01); *H04W 40/246* (2013.01); *H04W 72/0453* (2013.01); *H04W 72/082* (2013.01); *H04W 76/11* (2018.02); *H04W 80/06* (2013.01); *H04W 84/045* (2013.01); *H04W 84/105* (2013.01); *H04W 84/12* (2013.01); *H04B 17/318* (2015.01); *H04B 2001/7154* (2013.01); *H04W 8/005* (2013.01); *H04W 28/18* (2013.01); *H04W 48/02* (2013.01); *H04W 72/1231* (2013.01); *H04W 76/15* (2018.02); *H04W 84/18* (2013.01); *H04W 88/08* (2013.01); *H04W 88/10* (2013.01); *H04W 92/20* (2013.01)

(56) References Cited

U.S. PATENT DOCUMENTS

| | | |
|---|---|---|
| 2013/0308470 A1 | 11/2013 | Bevan et al. |
| 2014/0098682 A1 | 4/2014 | Cao et al. |
| 2014/0269526 A1 | 9/2014 | Mitola et al. |
| 2015/0004974 A1 | 1/2015 | Karimi-Cherkandi et al. |
| 2015/0038140 A1 | 2/2015 | Kilpatrick et al. |
| 2015/0071163 A1 | 3/2015 | Mackie |
| 2015/0133124 A1 | 5/2015 | Lim et al. |
| 2015/0195776 A1 | 7/2015 | Padden et al. |
| 2015/0350228 A1 | 12/2015 | Baxley et al. |
| 2016/0135204 A1 | 5/2016 | Mishra et al. |
| 2017/0094681 A1* | 3/2017 | Takeda .................. H04W 16/14 |
| 2017/0164323 A1* | 6/2017 | Markhovsky ....... H04W 64/006 |
| 2017/0195006 A1* | 7/2017 | Krasner ................ H04B 1/709 |

* cited by examiner

INDOOR POSITIONING AND TRACKING USING A MULTI-BAND WIRELESS NETWORKING SYSTEM

CROSS-REFERENCE TO RELATED APPLICATION(S)

This application claims priority to U.S. Provisional Patent Application 62/406,325 filed on Oct. 10, 2016 and entitled "DISTRIBUTED MULTI-BAND WIRELESS NETWORKING SYSTEM," which is hereby incorporated by reference in its entirety.

TECHNICAL FIELD

This application generally relates to indoor tracking objects, particularly through the use of wireless signal technology.

BACKGROUND

Satellite-based positioning systems such as the GNSS (Global Navigation Satellite System) can provide effective global position estimates (within a few meters) of a receiving device. Increasingly, such systems are being employed to provide location-based services in a number of applications including navigation, security, e-commerce, etc. Satellite-based location systems such as GNSS generally rely on relatively clear line-of-sight (LoS) between the receiving device and transmitting satellites. Accordingly, while effective outdoors, the ability of satellite-based positioning systems to effectively estimate the position of a receiving device located indoors is limited.

SUMMARY

Embodiments of the invention are described in the context of a multi-band (e.g., tri-band) wireless networking system. In some embodiments, the multi-band wireless networking system includes multiple wireless networking devices that are interconnected via a dedicated wireless communication channel or "backhaul." At least one of the wireless networking devices is connected to the Internet and serves as a router. The multi-band wireless network formed by the multiple wireless networking devices provides broad wireless coverage to client devices.

Techniques are introduced for indoor positioning and tracking of devices and objects using the aforementioned multi-band wireless network. In an embodiment, the multiple wireless networking devices of the system are coordinated via the dedicated backhaul, for example to manage time synchronization of signals received from the wireless networking devices that are indicative of a position of a client device or object. By coordinating the wireless networking devices via the dedicated backhaul and applying positioning processes to the received signals, a position of the client device or object is determined.

DETAILED DESCRIPTION

Overview

Figure 1:
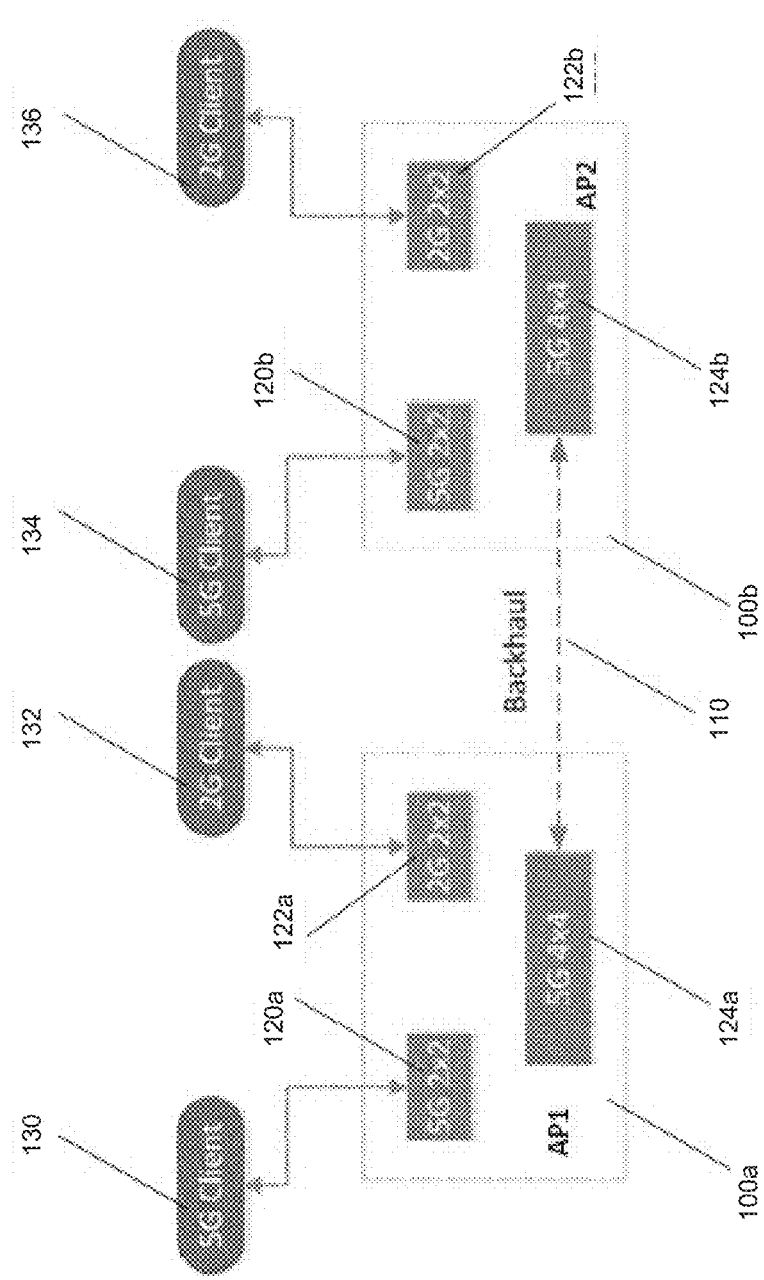
FIG. 1 is a block schematic diagram showing a backhaul link established between two nodes in a multi-band wireless networking system.

Indoor positioning using satellite-based location systems such as GNSS presents a challenge because such systems generally rely on relatively clear line-of-sight (LoS) between the receiving device and transmitting satellites.

To address this challenge, indoor position and tracking systems are introduced herein that utilize infrastructure for providing broad wireless network coverage. Specifically, a technique is introduced for using a multi-band wireless networking system to enable indoor positioning and tracking of mobile devices and other physical objects. The terms "position" and "positioning" as used herein shall be understood to include terms such as "location," "localization," "orientation," "orienting," and the like. The term "tracking" can be understood to be synonymous with "positioning" in certain contexts or may specifically imply the tracking of changes in position over time. In an embodiment, a multi-band wireless networking system includes multiple wireless networking devices forming nodes in a wireless mesh network. The nodes of the multi-band wireless networking system are interconnected and communicate with each other via a backhaul comprising a dedicated wireless communication channel. The multiple nodes collectively provide broad coverage to clients over a front haul comprising one or more wireless communication channels. The systems described herein can utilize multiple positioning techniques using multiple communications protocols such as WiFi or Bluetooth. Coordination among the devices, for example for time synchronization, can be performed over the dedicated backhaul.

The techniques described herein for indoor positioning and tracking can be applied in a number of different areas such as pet tracking, asset tracking (e.g., phone tracking, shopping mall asset tracking, etc.), indoor navigation, asset troubleshooting, wireless network configuration and calibration, intrusion detection, various analytics.

Multi-Band Wireless Networking System

Embodiments of the invention are described in the context of a multi-band (e.g., tri-band) wireless networking system. In some embodiments, the multi-band wireless networking system includes multiple wireless networking devices. At least one of the wireless networking devices is connected to the Internet and serves as a router. The remaining wireless networking devices serve as satellites that are wirelessly connected to the router via a wireless channel (i.e., a band), which is dedicated to the communications between the wireless networking devices (i.e., a dedicated backhaul. Both the router and the satellites provide wireless network connections (e.g., Wi-Fi connections) to client devices, such as desktop computers, laptop computers, tablet computers, mobile phones, wearable smart devices, game consoles, smart home devices, etc. The router and the satellites together provide a single wireless network having broad coverage to the client devices. The multi-band wireless networking system dynamically optimizes the wireless connections of the client devices without the need of reconnecting. An example of the multi-band wireless networking system is the NETGEAR® Orbi® system. Such systems are exemplified in U.S. patent application Ser. No. 15/287,711, filed Oct. 6, 2016 and Ser. No. 15/271,912, filed Sep. 21, 2016, both of which are hereby incorporated by reference in their entireties for all purposes.

The wireless networking devices of a multi-band wireless networking system can include radio components for multiple wireless bands, such as 2.5 GHz band, 5 GHz low band, and 5 GHz high band. In some embodiments, at least one of the bands can be dedicated to the wireless communications among the wireless networking devices of the system. Such wireless communications among the wireless networking devices of the system is referred to herein as "backhaul" communications. Any other bands can be used for wireless communications between the wireless networking devices of the system and client devices connecting to the system. The wireless communications between the wireless networking devices of the system and client devices are referred to herein as "front haul" communications.

FIG. 1 is a block schematic diagram showing a backhaul link established between two nodes in a multi-band wireless networking system. The term "node" in this context may refer to any device for the transmission and/or reception of wireless communication signals. For example, nodes may include WiFi access points (APs), WiFi base stations, Bluetooth devices, signal repeaters, signal monitors, etc. In some embodiments, a multi-band wireless networking system may be implemented as a mesh network with multiple nodes comprising mesh points in the mesh network. However, those skilled in the art will appreciate that the technique described herein can be readily implemented in other types of network configurations such as ring, star, etc. In FIG. 1, two APs 100*a* and 100*b* operating as nodes in the multi-band wireless networking system each include multiple radios 120*a*, 122*a*, 124*a* and 120*b*, 122*b*, 124*b*, respectively. As shown in FIG. 1, the multiple radios can include radios operating on a 2.5 Ghz band, 5 GHz low band, and 5 GHz high band. The APs 100*a* and 100*b* use some of the radios to communicate with various clients 130, 132, 134, and 136. In some embodiments, at least one radio at each AP is used to establish a dedicated backhaul 110 between the APs. Those skilled in the art will appreciate that the number of APs and radios per AP can vary depending on the implementation.

Besides regular WLAN services (e.g., data packet forwarding to and from the gateway and the Internet), in a number of implementations, the nodes in a multi-band wireless networking system can use dedicated backhaul links to perform other functions such as control and management functions (e.g., for coordinating roaming decisions). In addition, or as an alternative, such backhaul links can be used to provide more throughput, and/or to provide fault tolerance to the mesh network, for example, to provide redundancy against temporary interference, etc. As introduced in this disclosure, such dedicated backhaul links can also be used to perform certain functions related to indoor tracking, for example signal coordination and management of time synchronization.

As previously mentioned, in some embodiments, nodes in a multi-band wireless networking system can include radio components for three wireless bands, specifically the 2.5 GHz band, 5 GHz low band, and 5 GHz high band. In some embodiments, the multi-band wireless networking system dedicates the 5 GHz high band for backhaul communications by default, and uses the 2.4 GHz band and 5 GHz low band for front haul communications with client devices. For example, when the 2.4 GHz band is used for front haul communications, each node of the system can operate on a different channel in the 2.4 GHz band. Each band in this context can include multiple channels.

If the dedicated backhaul channel (e.g., a channel in the 5 GHz high band) goes down, the 2.4 GHz band can be used for backhaul communications among nodes of the system. For example, if a node operating in satellite mode detects that the backhaul channel in the 5 GHz high band is no longer available (e.g., due to strong interference), the node's 2.4 GHz radio component switches to a scan mode to look for an uplink connection at one of the 2.4 GHz channel with another node operating in router mode.

If there are multiple clean channels available for a node, the node can pick a clean channel that interferes less with other node that are in vicinity. A client channel can be defined based on a function of interference, number of APs, and/or other parameters. If the function for a channel is less than a threshold, the channel is a clean channel. There are various ways to detect nodes in vicinity. For example, networking topology among the nodes can be used to detect units in vicinity. Beacon power from other nodes can be used to detect nodes in vicinity. In some embodiments, a node can use a combination of networking topology and beacon power to detect other nodes in vicinity.

The nodes can communicate the front haul channel selections with other nodes through the dedicated backhaul channel. In some embodiments, nodes having higher-priority network traffic can have a higher priority in picking the front haul channel over other nodes.

A multi-band wireless networking system can make decisions regarding front haul channel selections in either a centralized way or a distributed way. In a distributed way, each node can make decision on channel selection for itself. For example, in some embodiments, a base node can pick a front haul channel first. Then each satellite node can pick a front haul channel after the satellite node establishes a backhaul link with the base node. The system can optimize the channel selection based on a predefined schedule or selection criterion. In some embodiments, nodes handling higher-priority network traffic can have a higher priority in picking the front haul channel over other nodes during system boot-up or during scheduled channel optimization.

In a centralized way, a base node makes decisions of channel selections for all other nodes of the system. Each satellite node establishes a dedicated backhaul link with the base node and scans the channels in the front haul band(s). Each satellite node sends detailed information regarding candidates of front haul channels to the base node. The detailed information can include, for example, scan results on all channels in the front haul band(s), and interference on all channels in the front haul band(s). The base node can make the centralized decision on channel selection periodically over time.

Figure 2:
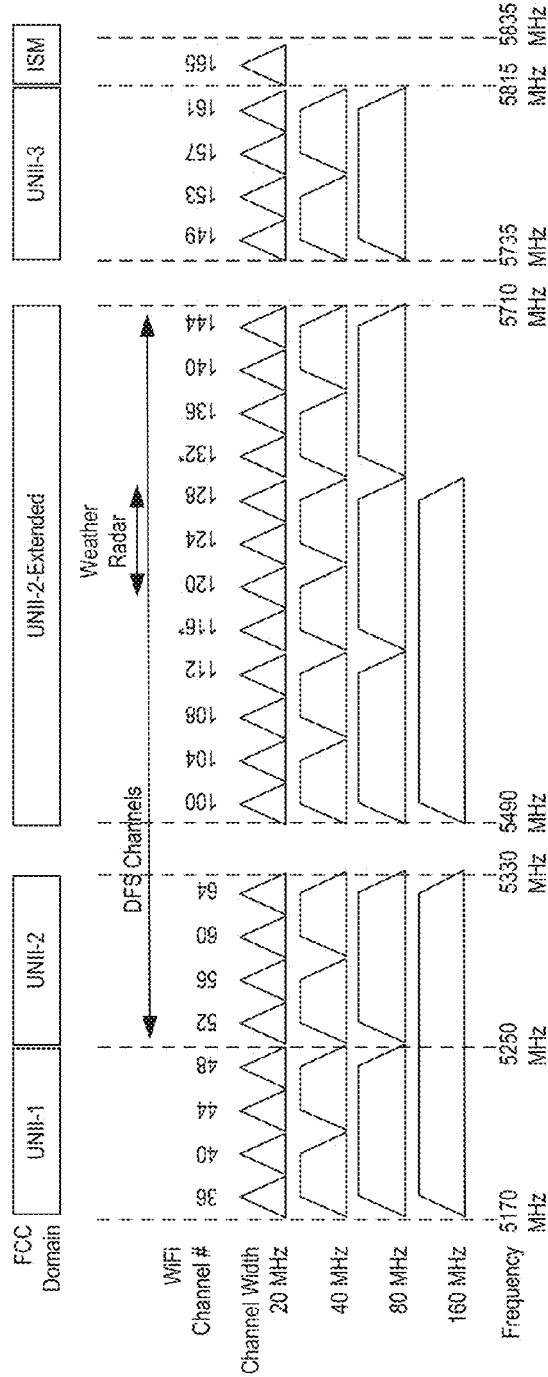
FIG. 2 shows 5 GHz channel allocation in North America.
Figure 3:
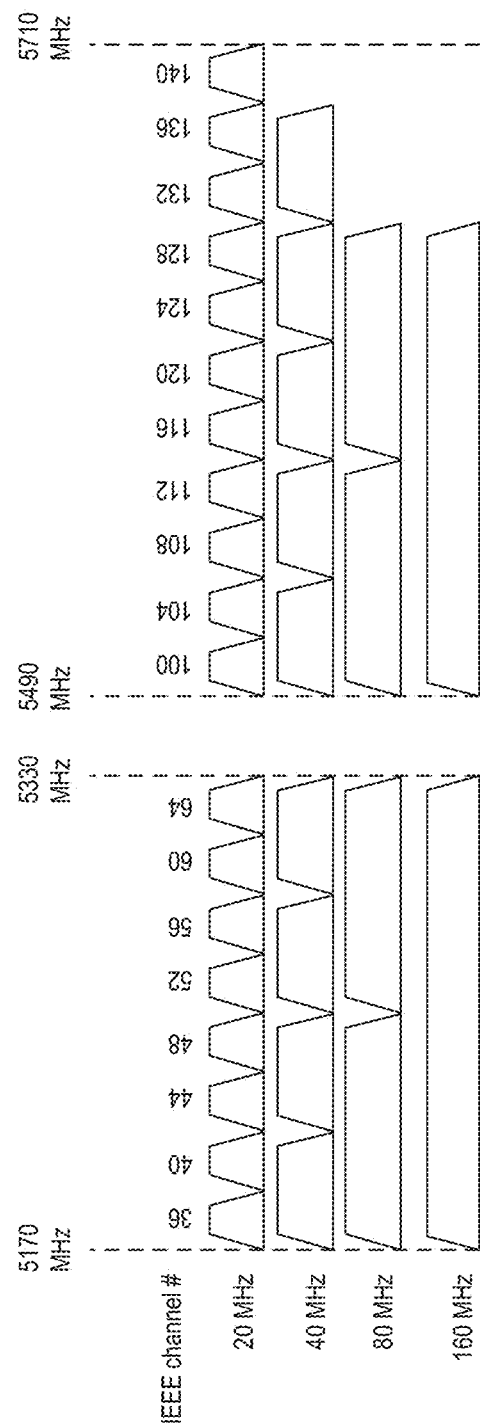
FIG. 3 shows 5 GHz channel allocation in Europe.

The units of the system can also use 5 GHz channels for front haul communications. FIGS. 2 and 3 show 5 GHz channel allocation in North America and Europe. Some of the 5 GHz channels require a mechanism of dynamic frequency selection (DFS) to allow devices to share the channels (called DFS channels). Particularly, devices are required to have DFS capabilities for channels allocated to radar systems so that those devices do not cause interference to radars.

If a particular node of the system does not have DFS capability to avoid radar interference, the node may be limited to pick non-DFS 5 GHz channels, such as channels #36, 40, 44, 48, as primary 80 MHz channel on UNII-1. The node can keep 80 MHz bandwidth and change the primary channel, if the system has more control frames than data frames and mostly one AP is active. Alternatively, the node can reduce the bandwidth to accommodate channel planning in some use cases such as business use or busy home use. For example, depending on a total number of nodes of the system, the node can reduce bandwidth to 40 MHz or 20 MHz.

If a node of the system does have DFS capability, the unit can pick a DFS channel that is clear for usage for front haul communications. The nodes of the system can use different 80 MHz channels for front haul communications, since there are multiple 80 MHz channels available as illustrated in FIG. 2.

Similar to the 2.4 GHz case, the system can conduct the 5 GHz channel selection either in a centralized way or a distributed way. The channel selection can use different channels with different bandwidths. For example, a node can choose among two 80 MHz channels, or four 40 MHz channels, or eight 20 MHz channels, or a combination of one 80 MHz channel and two 40 MHz channels, or a combination of one 80 MHz channel, one 40 MHz channel and two 20 MHz channels, etc. The bandwidth selection can be conducted depending on use case and amount of load. For example, if one node (e.g., an AP) has many clients and lots of traffic, the node can receive more channels.

If the system uses the 5 GHz high band for backhaul communications, there is only one 80 MHz channel available in North American as illustrated in FIG. 2. The system can decide to reduce the bandwidth, thus increasing the number of available channels. For example, if part of the 80 MHz backhaul channel is very busy, the system can reduce the bandwidth to 40 MHz or 20 MHz. The system can make the decision for backhaul in a centralized manner. In other words, all nodes conduct channel scanning and send detailed information regarding the channels to the base node. The base node makes the decision for backhaul and broadcast backhaul channel information to the satellite nodes. If DFS channels are available for backhaul communications, the system can use those DFS channels. For example, there can be two 80 MHz DFS channels in North America as illustrated in FIG. 2. For Europe, all 5 GHz channels are DFS channels as illustrated in FIG. 3. The system can pick the best DFS channel based on DFS channel availability and channel utilization parameters as well as power levels.

Indoor Positioning and Tracking with a Multi-band Wireless Networking System

A multi-band wireless networking system can employ various localization techniques using various wireless communications protocols, for example, WiFi, Bluetooth, and/or Bluetooth low energy (BLE). The various positioning techniques can include, for example, time of arrival (ToA), time difference of arrival (TDoA), round trip time (RTT), angle of Arrival (AoA), and received signal strength (RSS). Moreover, hybrid positioning systems implementing multiple techniques as TDoA and AoA, ToA and RSS, or TDoA and RSS can be used to improve the accuracy.

Time of arrival (ToA) measures the time to transmit a signal from a signal emitter to a signal receiver. For example, a client device in wireless communication with a multi-band wireless networking system may transmit a signal which is received by one or more of a plurality of nodes (e.g., APs) of the multi-band wireless networking system, or vice versa. In some cases, signal transmitted from the client device may include a timestamp that is then used along with a timestamp upon receipt at a particular node to calculate the elapsed time of travel of the signal. With a known speed of the signal (the speed of light in the case of radio signals) a distance between the transmitting device and the receiving node can be calculated.

Figure 4:
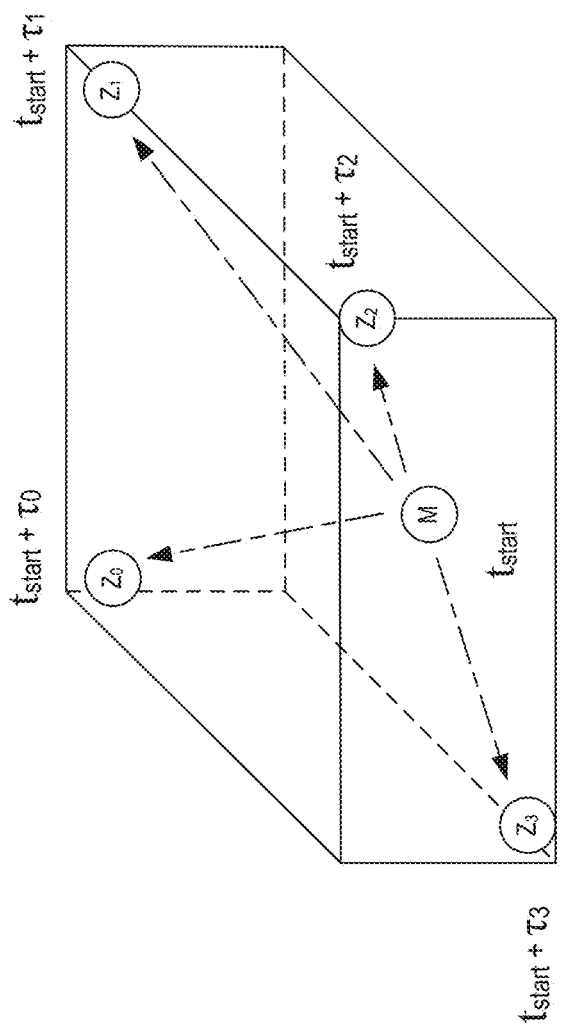
FIG. 4 is a diagram illustrating a technique for positioning using Time of Arrival (ToA) measurements.

FIG. 4 illustrates the concept using ToA measurements to determine a position of a client device using trilateration (described later). As shown in FIG. 4, a signal originates from an unknown position M at an initial time ($t_{start}$) and is received at multiple nodes at known positions $Z_0$, $Z_1$, $Z_2$, and $Z_3$, at times $t_{start}+\tau_0$, $t_{start}+\tau_1$, $t_{start}+\tau_2$, and $t_{start}+\tau_3$, respectively. In such an embodiment, time synchronization among the nodes is performed to measure the relative delay in time to arrive at each node.

Time distance of arrival (TDoA) is similar to ToA in concept except that it refers to taking the difference in two ToA measurements from different receiving points. TDoA may be particularly suited to passive systems in which the time of transmission from the signal emitter is not known.

Round trip time (RTT) refers to the measured length of time for a signal to be sent plus the time for an acknowledgment signal to be received. For example, in an embodiment, a triggering signal may be sent by a node of the multi-band wireless networking system to a client device which then causes the client device to send an acknowledgment signal in response. Similarly, the client device may initiate by sending a triggering signal that is picked up by one or more of a plurality of nodes in the multi-band wireless networking system that then cause them to send a response. In either case, the relative delay from the time the triggering signal is sent to the time a response is received (i.e., RTT) can be measured.

In contrast with ToA, RTT may be used to avoid the need to synchronize signal transmission and receipt. The system can use a linear regression with mean square error as the model which best relates the statistical estimator of the RTT to the actual distance between two wireless units in line-of-sight (LoS) or non-line-of-sight (NLoS). The statistical estimator that best fits that model is found with the aim of improving the accuracy achieved in distance estimates.

A received signal strength (RSS) or received signal strength indication (RSSI) is a measure of the power present in a received signal. Given a known signal transmission power, the measured RSS or RSSI may in some cases be used to calculate a distance to the point of transmission. Measured RSS or RSSI can depend on a number of factors other than the absolute distance, such as the characteristics of the indoor space (e.g., geometry, materials, etc.) as well as environmental characteristics such as temperature and humidity that impact the attenuating effect of the atmosphere. Accordingly, in some cases it may be beneficial to measure relative RSSI based on signals received at a number of nodes.

Figure 5:
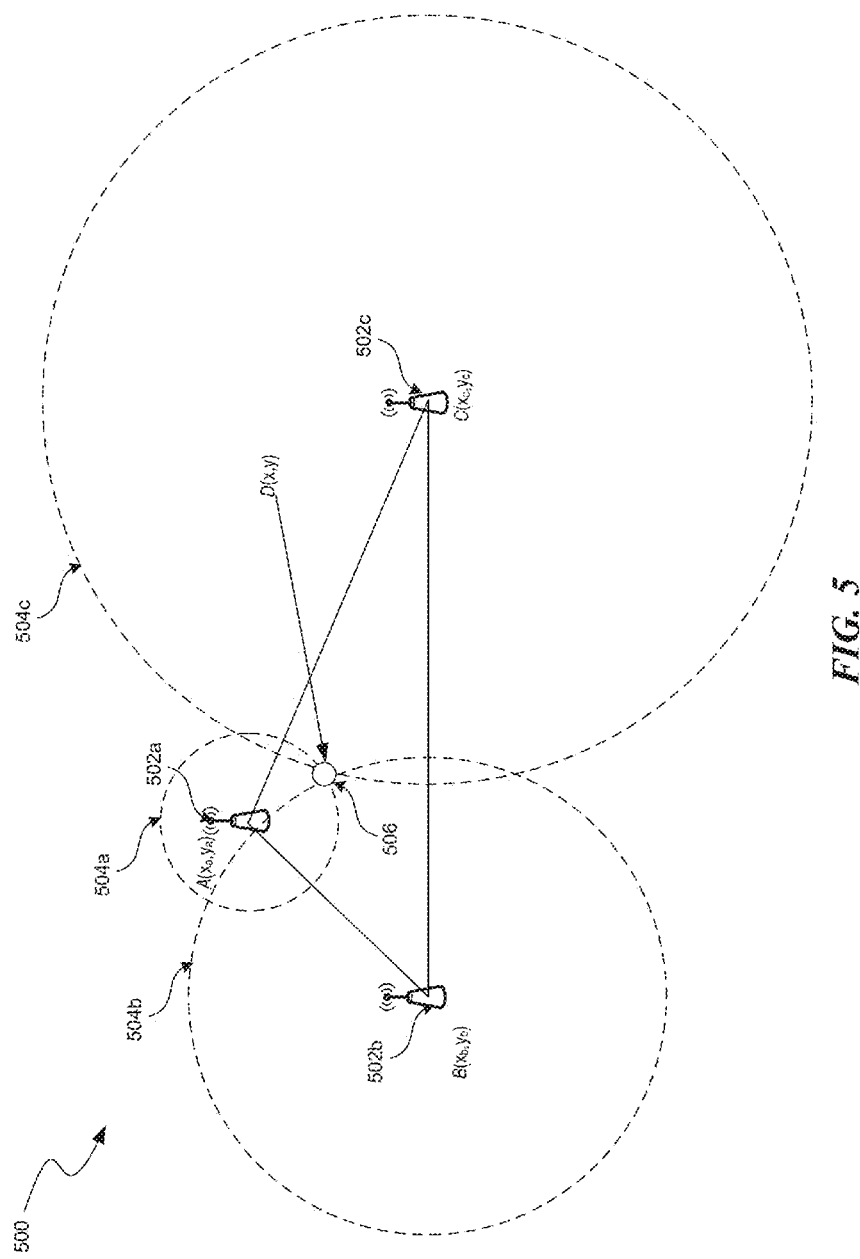
FIG. 5 is a diagram illustrating a technique for positioning using trilateration.

As described above, a number of techniques such as ToA, TDoA, RTT, and RSS, can be used to estimate a distance between a transmission and receiving position. Given such measurements, a position can be calculated, for example using trilateration. FIG. 5 shows an example network 500 of three nodes 502a, 502b, and 502c. As previously discussed, these nodes may be part of a multi-band wireless networking system and communicate with each other over a dedicated backhaul. As shown, the three nodes 502a, 502b, and 502c are located at known positions A, B, and C (respectively). In an embodiment one or more of the aforementioned techniques (e.g., are applied to measure a distance to a client device based on signals transmitted over front haul communications links. The measured distances from each node 502a, 502b, and 502c to the client device 506 are represented in FIG. 5 as circles 504a, 504b, and 504c, respectively. In other words, from the point of view of a single node, the client device may reside at any point along a given circle with a radius equal to the measured distance to the client device. However, given distance measurements from all three nodes, a specific position can be determined as it will coincide with the single intersection point D of all three circles 504a, 504b, and 504c.

Although not shown in FIG. 5, a single TDoA measurement would place a signal emitter along a hyperboloid or hyperbola with the two receiving sensors at the foci. As with the previously described trilateration using ToA, a position of the emitter can be resolved to coincide with the intersection of three hyperbolas that are based on TDOA measurements between three receiving sensors.

Figure 6:
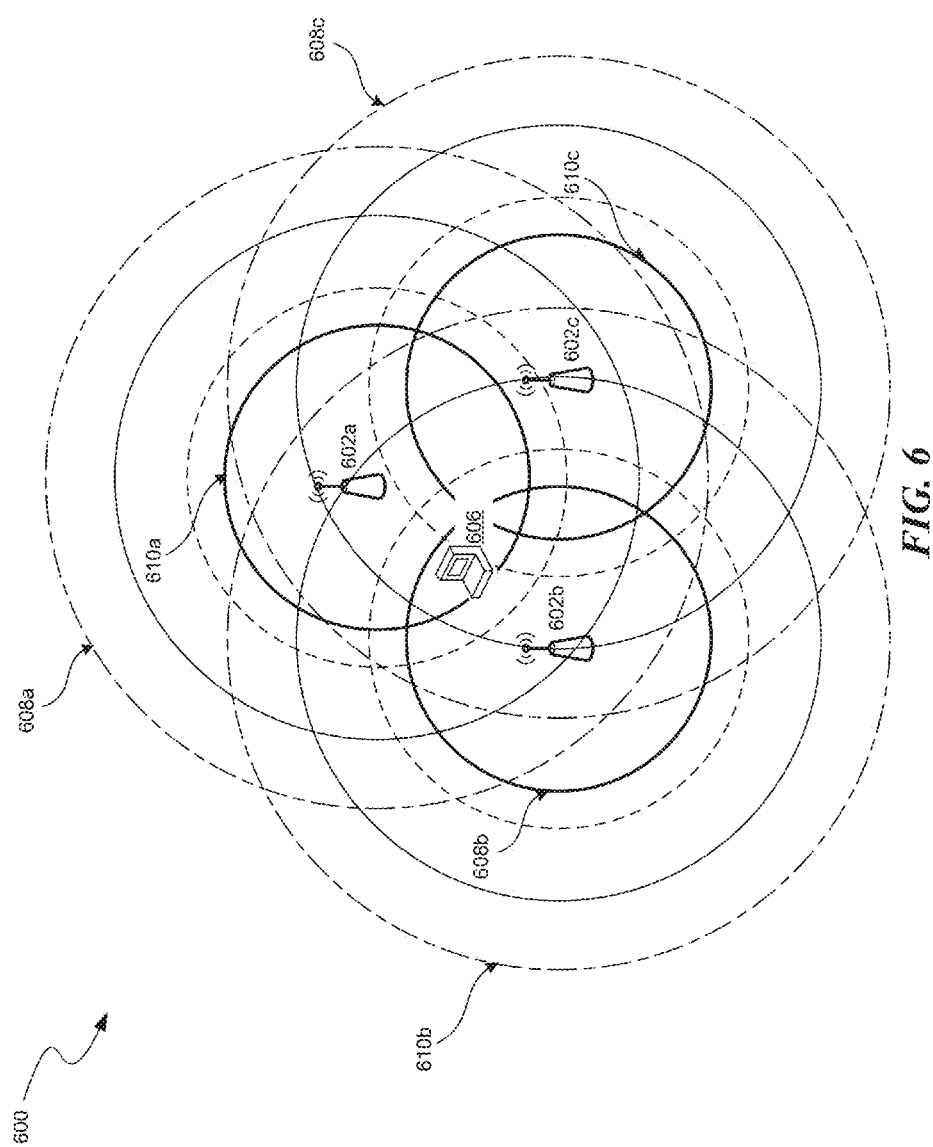
FIG. 6 is a diagram illustrating a technique tracking a device using Bluetooth and WiFi.

The above described techniques for positioning using trilateration can be based on signals transmitted over using any wireless protocol such as WiFi, Bluetooth, BLE, etc. For example in an embodiment, the system can utilize Bluetooth or BLE signals between the client device 506 and the nodes 502a-c to estimate distances based on, for example, ToA, TDoA, RTT, and RSS, etc. At the same time, the system can utilize backhaul communications over a dedicated WiFi communication link (e.g., in the 5 GHz high band) for coordination and time measurements. In other words, the management of time synchronization of Bluetooth/BLE may be performed over the dedicated backhaul. For example, FIG. 6 shows system 600 in which a client device 606 is within range of and communicating with multiple nodes 602a-c over Bluetooth channels (as indicated by solid line concentric circles 608a-c, respectively), while the multiple nodes 602a-c communicate with each other over WiFi (as indicated by dotted line concentric circles 610a-c, respectively). A person having ordinary skill will recognize that this is just an example and that other embodiments may be configured differently.

In some embodiments, a system may utilize proximity estimation techniques (e.g., using Bluetooth or BLE) to detect when device (e.g., a client device) is within or outside a particular range of the one or more nodes of a multi-band wireless network. For example, one or more of the nodes 602a-c in FIG. 6 may detect (e.g., using BLE) that device 606 is within a certain proximity even if the device 606 is not yet connected to the multi-band wireless network and is therefore not technically a client. In some embodiments, the system may identify a node that is closest to the device 606 to perform a proximity estimation. Similar to as described above, proximity estimations (e.g., based on ToA, RSSI, etc.) by multiple nodes (e.g., through the use of Bluetooth or BLE) can be coordinated through the dedicated wireless backhaul to determine a position of the device 606. In some embodiments the system may detect when a device has moved outside of a particular range and cause the device to switch to an alternative positioning system (e.g., GPS). While causing the switch to GPS, the system may also signal the device to turn off energy resource heavy systems such as WiFi and Bluetooth until the device is back within range for indoor positioning.

Figure 7:
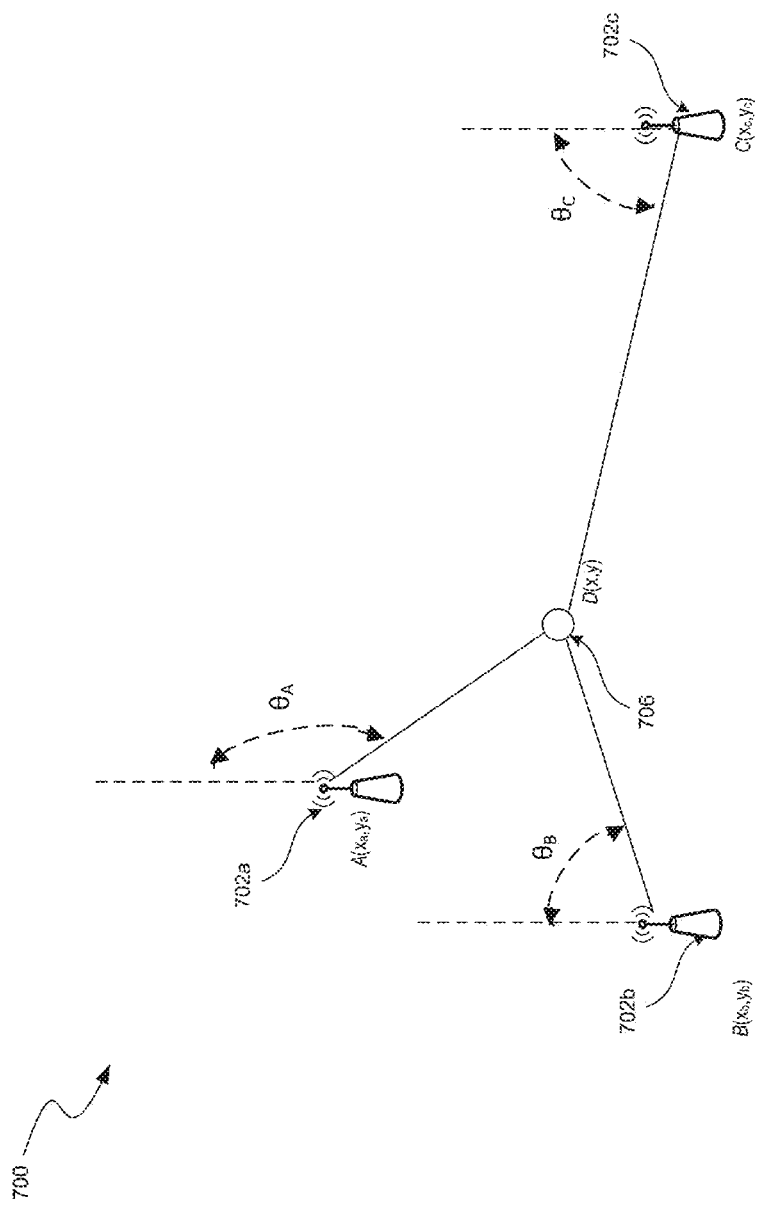
FIG. 7 is a diagram illustrating a technique of positioning using triangulation based on Angle of Arrival (AoA) measurements.

Angle of Arrival (AoA) refers to the measured angle of incidence of a propagating signal at a receiver. By determining an angle of incidence of an emitted signal at multiple known positions, a position of the emitter can be resolved through a process generally referred to as triangulation. FIG. 7 shows an example network 700 that illustrates this concept. As shown in FIG. 7, example network 700 includes multiple nodes 702a, 702b, and 702c. As previously discussed, and similar to the system 500 of FIG. 5, these nodes may be part of a multi-band wireless networking system and provide broad coverage to a client device through front haul communications channels while communicating with each other over a dedicated wireless backhaul. As shown, the multiple nodes 702a, 702b, and 702c are located at known positions A, B, and C (respectively). Although three nodes are shown in the example system 700, this is not to be construed as limiting. For example, the concept behind triangulation can similarly be applied with two nodes at known positions or more than three nodes at known positions.

In the example system 700 depicted in FIG. 7, a client device 706 has broadcast a signal that is then received at each of the nodes 702a-c. In some cases the broadcast signal by the client device may be part of general wireless communication over the front haul communications channel. In some cases, one or more or the node 702a-c may transmit a triggering signal to the client device 706 which in response then broadcasts a beacon signal. In any case, an AoA determination can be made with respect to the received signal at each of the nodes 702a-c. As shown in FIG. 7, the AoA of the incident signal is represented as $\theta_A$, $\theta_B$, and $\theta_B$ at nodes 702a, 702b, and 702c (respectively). Using the measured AoA at each of the nodes, the unknown position D of the client device 706 can be resolved.

One or more techniques can be applied to determine AoA of an incident signal at a receiver. For example, the AoA can be determined using an array of multiple antennae at a receiver and calculating TDOA at each of the multiple antennae forming the array. In some cases, the emitted signal may comprise a beamformed RF transmission. In such an example, an AoA can be determined by detecting differences in the phase and power level across an array of antennae at the receiver.

Figure 8:
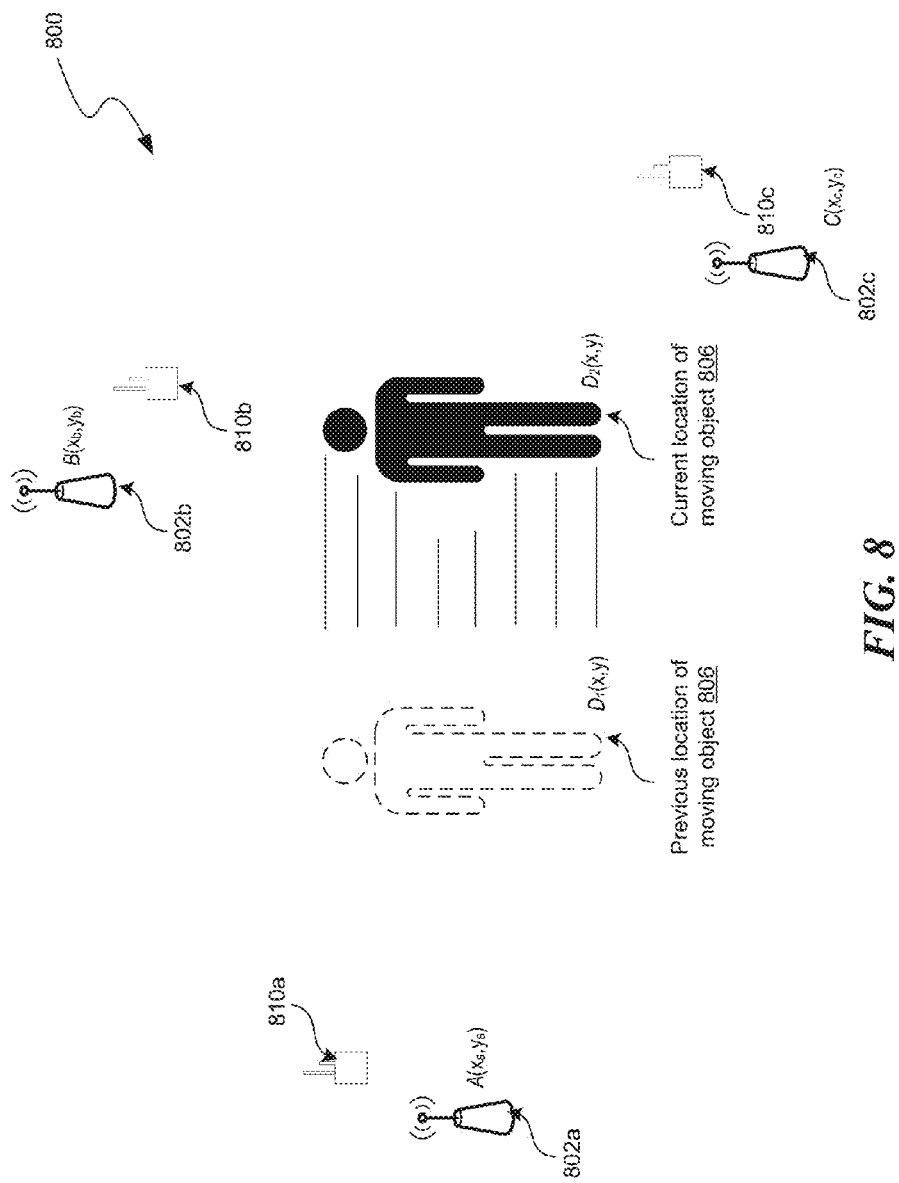
FIG. 8 is a diagram illustrating an example technique for device-free passive positioning.

Wireless communication signals can also be applied for device-free passive positioning and tracking. In other words, in some cases, positioning and tracking of an object may not depend on the object including a device for transmitting and receiving wireless signals from nodes of a multi-band wireless network. FIG. 8 shows an example system 800 that illustrates this concept. As shown in FIG. 8, example network 800 includes multiple nodes 802a, 802b, and 802c. The example network also includes multiple signal monitors 810a, 810b, 810c. Although shown in FIG. 8 as discrete components, the single monitors 810a-c may be part of nodes 802a-c. As previously discussed, and similar to the system 500 of FIG. 5, these nodes may be part of a multi-band wireless networking system and provide broad coverage to a client device through front haul communications channels while communicating with each other over a dedicated wireless backhaul. As shown, the multiple nodes 802a, 802b, and 802c (and associated wireless signal monitors 810a-c) are located at known positions A, B, and C (respectively). Although three nodes are shown in the example system 800, this is not to be construed as limiting.

In an example scenario, an on object 806 (e.g., a human) passes through the multi-band wireless network formed by the system of nodes 802a-c. As the object 806 passes through the multi-band wireless network, the one or more signal monitors 810a-c may detect changes in the characteristics of RF signals transmitted by nodes 802a-c due to interference caused by the physical object 806 passing though. Using positioning algorithms, such changes in the RF signal field may be determined to correspond with the presence of a particular object at a position D relative to the know positions of the nodes 802a-c and signal monitors 810a-c. Again, coordination of signal transmission and monitoring by nodes 802a-c (and monitors 810a-c) can be performed via a dedicated wireless backhaul over which these devices communication.

Figure 9:
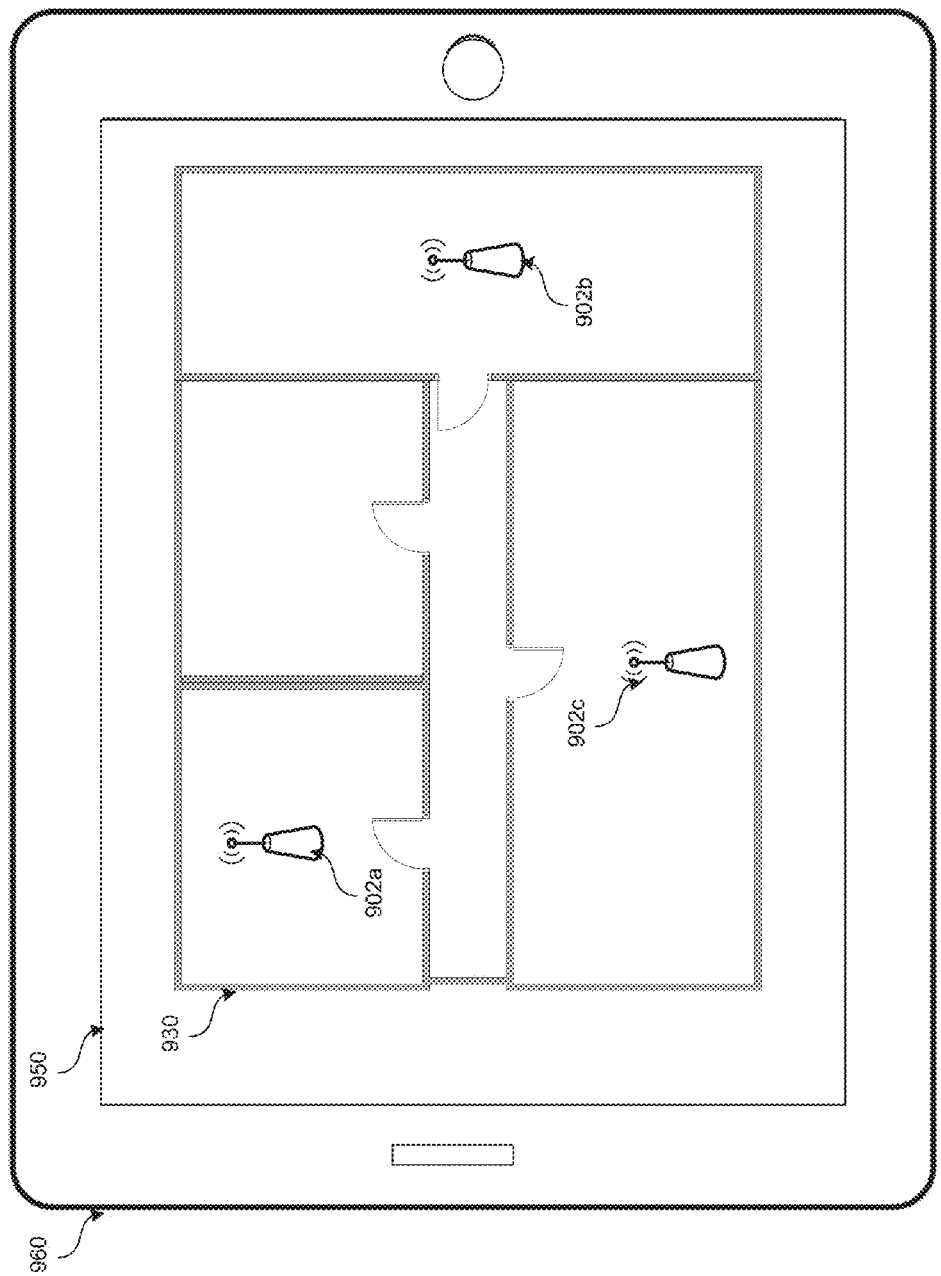
FIG. 9 shows an example graphical user interface (GUI) for defining the positions of nodes in a multi-band wireless networking system.

As previously alluded to, the indoor tracking of a device or some other may involve first determining the positions of one or more of the nodes forming the multi-band wireless network. Determining the positions of the nodes can be performed using various techniques. For example, in some embodiments, the positions of one or more of the nodes comprising the multi-band wireless network may be defined based on user inputs received via a computing device. FIG. 9 shows an example display of an example graphical user interface (GUI) 950 via a computing device 960 (e.g., a tablet device as depicted). The example GUI 950 includes a display of an example floor plan 930 through which a user can define positions of the one or more nodes forming the network. For example, as shown in FIG. 9, through interaction with the example GUI 950, a user may place graphical representations 902a-c of the one or more nodes at their corresponding positions within the space.

The GUI 950 depicted in FIG. 9 may be generated and displayed by an application instantiated at the device 960. The device 960 may be a client device in communication with one or more of the nodes represented by graphical elements 902a-c via a front haul communications channel. In some embodiments, the positions are determined based on the user inputs and transmitted to each of the one or more nodes, to another computing device communicating over the network, or to a remote server.

Figure 10:
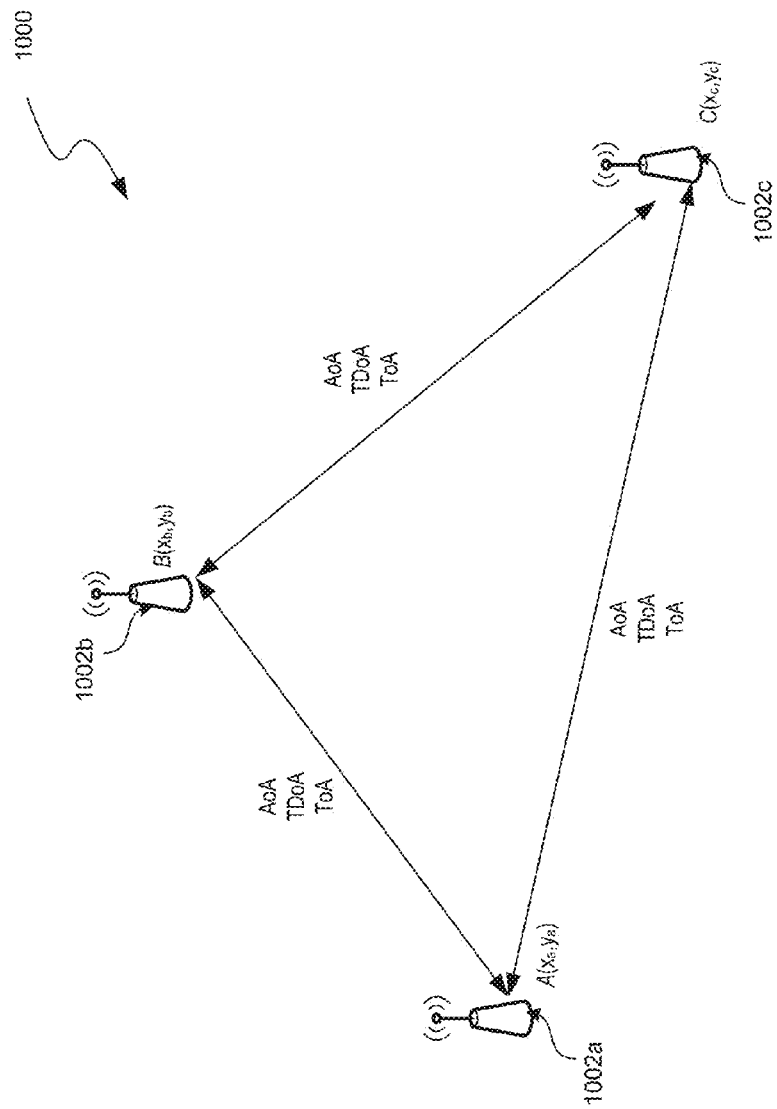
FIG. 10 is a diagram illustrating a technique for determining the positions of nodes in a multi-band wireless networking system.

Alternatively, or in addition, any one or more of the previously described positioning techniques based on wireless signals may be utilized to determine the position one or more of the nodes forming the multi-band wireless network. For example, as shown in FIG. 10 any one or more of the positioning techniques (e.g., ToA, TDoA, AoA, RSSI, RTT, etc.) may be applied to signals transmitted between nodes 1002a-c of example system 1000 to locate one or more of those nodes relative to each other. Signals used to locate nodes may be transmitted via any of the front haul or dedicated backhaul channels. Again, coordination and the management of time synchronization of positioning signals may be performed over dedicated backhaul.

Figure 11:
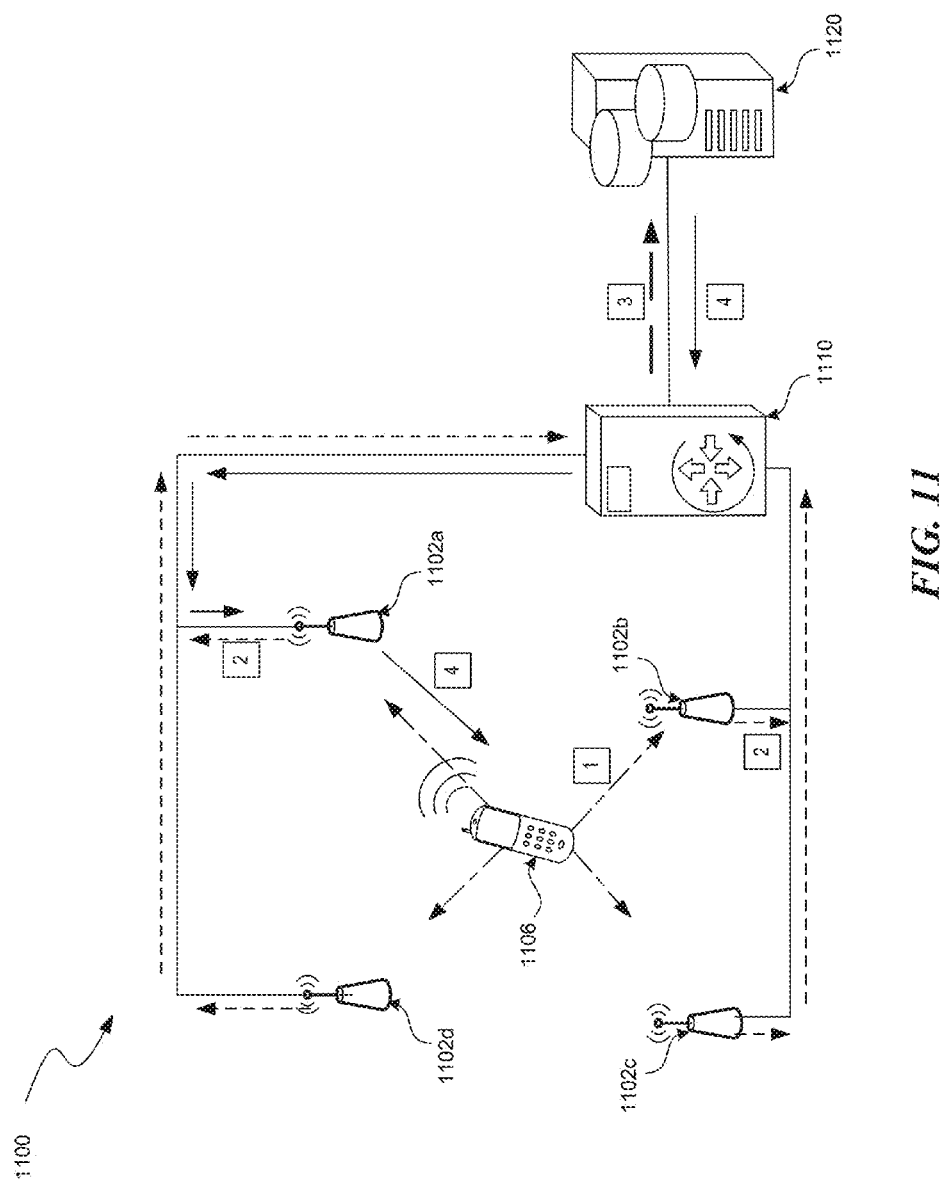
FIG. 11 is a diagram of an example system for indoor positioning using a multi-band wireless networking system.

The process of determining a position of a device or object can be performed at any one or more of the nodes comprising a multi-band wireless network or may be performed at one or more other computing devices in connected to the network. For example, in some embodiments, position determination and/or tracking can be performed at a local aggregation server and/or at a remote server. FIG. 11 shows an example process flow through in the context of an example system 1100 that illustrates how processing may be performed at a remote server.

As shown in FIG. 11, at a first step a client device 1106 connected to the multi-band wireless network transmits a positioning request that is received by one or more of the nodes 1102a-d of the network. FIG. 11 shows the positing signal from client device 1106 being received specifically at nodes 1102a and 1102b to which the client device is within signal range. As previously discussed, this positioning signal (e.g., a request) may be transmitted over one or more front haul communications channels of the multi-band wireless network. Note that in some situations the positioning signal is transmitted by the client device 1106 in response to receiving a triggering signal from one or more of the nodes 1102a-c.

The positioning signal transmitted by the client device 1106 may include any type of wireless transmission such as a simple beacon signal or a transmission including specific data related to the position of the device. For example, in some embodiments the device itself may include systems configured to determine the position of the device such as a GPS receiver, proximity sensing devices, optical sensing devices, motions sensing devices (e.g., an accelerometer, gyro, inertial measurement unit (IMU), etc.). In such cases, the client device may transmit, as part of the positioning signal, any information generated by these systems that may be utilized to resolve a position of the device. In any case, the positioning signal can be understood to be indicative of the position of the device 1106 even if it is just a simple beacon signal that can be utilized for positioning, for example, through the use of ToA, TDoA, AoA, RSSI, etc.

At step 2, the nodes 1102a and 1102b at which the position signal is received forward the signal to a local aggregation server 1110, for example via a dedicated backhaul communication channel. Alternatively, or in addition, the positioning signal received at any of nodes 1102a or 1102b may be processed at that node, for example to determine any information related to ToA, TDoA, AoA, RSSI, RTT, etc. This information determined as a result of the processing is then forwarded to the aggregation server 1110, again as a signal indicative of the position of the client device 1106.

At step 3, the aggregation server 1110 aggregates any information received from the one or more nodes, and forwards the aggregated information to a remote computation server 1120 for processing to determine a position of the client device 1106 based on the received information. Forwarding of information to the remote computation server 1120 may be via any one or more private and/or public networks of any type (e.g., the Internet). In some embodiments the process of aggregating received information may include coordinating time synchronization among the multiple nodes via the dedicated backhaul channel. With time synchronization managed, one or more positioning algorithms can be applied to the received information to determine a position of the client device 1106.

At step 4, once a position of the client device 1106 is determined, that position can be made available through several different mechanisms. For example, as shown in FIG. 11, a signal indicative of the determined position can be transmitted by the remote computation server 1120 to the client device 1106, for example via the multi-band wireless network coverage provided by the nodes 1102a-d. In some cases this step can include causing display, via a display of the client device 1106 of a graphical indication of the position, for example as a real-time map indicating the position. Alternatively or in addition, the determined position may be accessed by any another computing device connected to the multi-band wireless network and/or any other computer network.

Note that the process flow depicted in FIG. 11 is an example provided for illustrative purposes and is not to be construed as limiting. Similar processes for determining the position of the client device 1106 or any other object may be performed using fewer or more steps than as described with respect to FIG. 11 and/or fewer or more components than as shown in FIG. 11. For example, the steps of aggregating information, coordinating time synchronization, and/or determining position may, in some embodiments, be performed at any one or more of the nodes 1102a-d instead of a dedicated aggregation server 1110 or remote computational server 1120. For example one of the nodes 1102a-d may be a base node that includes additional computer processing resources for performing such actions. Similarly, the steps of aggregating information, coordinating time synchronization, and/or determining position may be performed at a local computing device such as the aggregation server 1110 instead of forwarding to a remote computation server 1120. Further, the example process flow described with respect to FIG. 11 may be performed to instead determine a position of any one or more of the nodes 1102a-d, for example as described with respect to FIG. 10.

Figure 12:
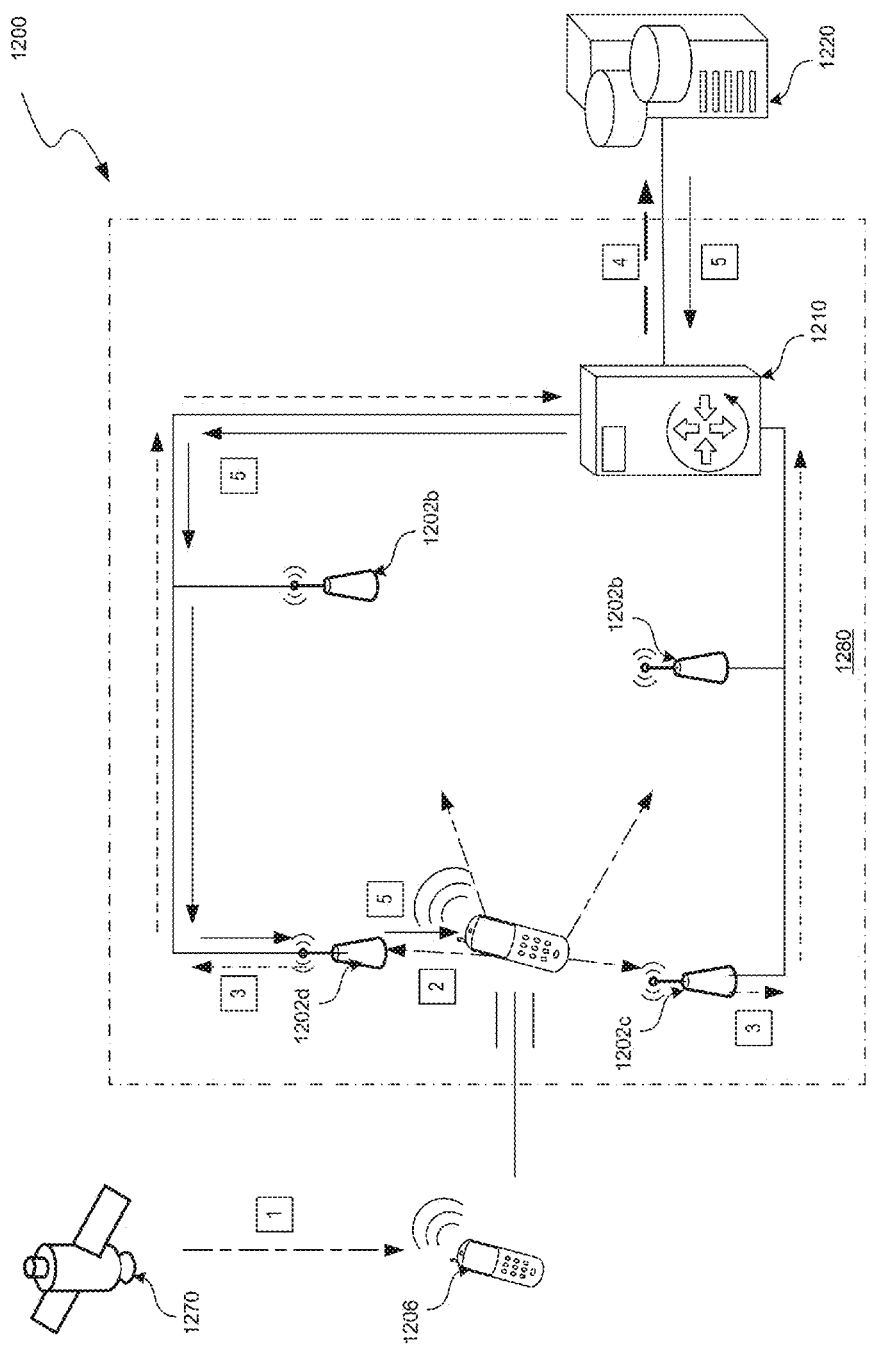
FIG. 12 is a diagram of an example system for indoor and outdoor positioning using a multi-band wireless networking system.

Systems for indoor positioning and tracking (e.g., using a multi-band wireless network) can be configured to integrate with outdoor positioning systems to provide seamless tracking at all time. FIG. 12 shows an example process flow through in the context of an example system 1200 that illustrates how such an integration may be configured.

In the scenario depicted in FIG. 12, a device 1206 is initially outside of a building indicated by the dotted line box 1280. While outside, the device 1206 can utilize any available positioning systems to determine its position. For example, at step 1, the device 1206 may receive GPS signals from GPS satellites 1270 that are used to determine a global position of the device.

As previously discussed, once the mobile device 1206 enters the building 1280, satellite-based positioning systems such GPS become unreliable due to interference of the GPS signals from the satellites. Accordingly upon entry into the building, positioning of the device 1206 may be handled using any of previously described indoor tracking techniques. For example, as shown in FIG. 12, the example system 1200 includes a multi-band wireless network comprised of multiple nodes 1202a-d located within the building 1280 that can be utilized for indoor tracking.

In an embodiment at step 2, the device 1206 transmits a positioning request that is received by one or more of the nodes 1202a-d of the network. For example, the positioning request may be transmitted by device 1206 in response to determining that satellite-based positioning is no longer available. FIG. 12 shows the positing signal from client device 1206 being received specifically at nodes 1102c and 1102d to which the client device is within signal range. As previously discussed, this positioning signal (e.g., a request) may be transmitted over one or more front haul communications channels of the multi-band wireless network.

In another embodiment, the multi-band wireless network may detect the client device 1206 coming within range. For example, as the device 1206 enters the building 1280 it comes within range of and is detected by one of the nodes 1202d, for example using BLE. In response to proximity detection, one or more of the nodes 1202a-d within range transmit a triggering signal that causes the device 1206 to at step 2 transmit a positioning signal.

In either case, once inside, determining and tracking the position of the client device may be performed similar to as described with respect to FIG. 11. For example, at step 3, the nodes 1202c and 1202d at which the position signal is received forward the signal to a local aggregation server 1210, for example via a dedicated backhaul communication channel. At step 4, the aggregation server 1210 aggregates any information received from the one or more nodes, and forwards the aggregated information to a remote computation server 1220 for processing to determine a position of the device 1206 based on the received information. Once the position is determined, at step 5 the computation server 1220 transmits a signal indicative of the position, for example, to the device 1206 via the multi-band wireless network.

Again, the process flow depicted in FIG. 12 is an example provided for illustrative purposes and is not to be construed as limiting. Similar processes for determining the position of the device 1206 or any other object may be performed using fewer or more steps than as described with respect to FIG. 12 and/or fewer or more components than as shown in FIG. 12. For example, the steps of aggregating information, coordinating time synchronization, and/or determining position may, in some embodiments, be performed at any one or more of the nodes 1202a-d instead of a dedicated aggregation server 1210 or remote computational server 1220. For example one of the nodes 1202a-d may be a base node that includes additional computer processing resources for performing such actions. Similarly, the steps of aggregating information, coordinating time synchronization, and/or determining position may be performed at a local computing device such as the aggregation server 1210 instead of forwarding to a remote computation server 1220. Further, outdoor positioning of the device 1206 may involve other positioning techniques not depicted such as cellular-wireless signals, inertial measurements, visual odometry, etc.

The systems described with respect to FIGS. 5-12 can use different protocols for positioning and tracking. For example, with respect to FIG. 12, any of nodes 1202a-d may employ various protocols in a request sent to the client device 1206 to conduct a set of timing measurements with other nodes 1202a-d. For example, 802.11k may use be used with standardized RSSI measurements if RSSI is used for positioning. In some cases, 802.11u may be used to address the requirement for position awareness for E911. Further, 802.11v may be used since it provides formats for sending RSSI+geolocation (from GPS/aGPS) around a given network.

In some embodiments, the Fine Timing Measurement (FTM) protocol under IEEE 802.11 may also be used. For example, a client device 1206 can request one of nodes 1202a-d to share its position (e.g., in latitude/longitude coordinates or as a civic address). In response, the node 1202a-d may share position information including its relative height above ground (e.g., floor number or elevation) with the requesting device 1206. A node 1202a-d can share a set of node positions in the form of a "neighbor report,"

which can significantly enhance the efficiency of the data exchange. A node 1202*a*-*d* can send a request to a device 1206 to conduct a set of timing measurements with other nodes 1202*a*-*d*. A node 1202*a*-*d* can send a request to the device 1206 to report its position. A device 1206 can send a request to a node 1202*a*-*d* to share a URI or Domain Name where additional assistance or maps and mapping data can be obtained. A device 1206 and a node 1202*a*-*d* can negotiate to schedule timing measurements at pre-arranged times and use such timing measurements for position estimation. In some embodiments, position determinations made using the described indoor tracking systems can be combined with position determinations made using other means, for example GPS. In some other embodiments, the system can also track positions based on IP addresses or known SSID (Service Set Identifier).

Figure 13:
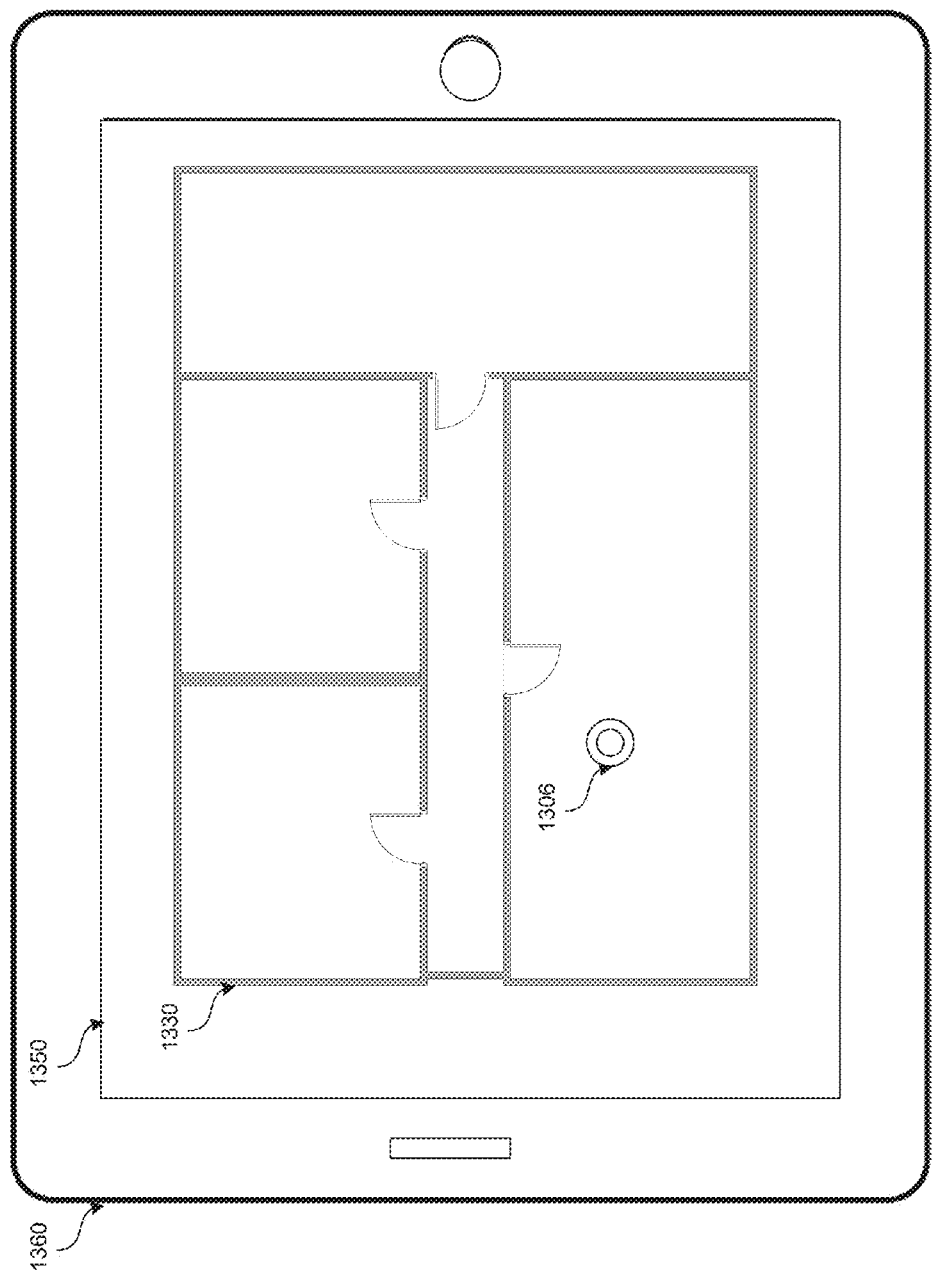
FIG. 13 shows an example graphical user interface (GUI) displaying a visual indicator of a determined position of a device or object.

The determined position of a particular device or object can be output for display as a visual indicator via a display of computing device. FIG. 13 shows an example display of an example graphical user interface (GUI) 1350 via a computing device 1360 (e.g., a tablet device as depicted). The example GUI 1350 includes a display of an example map or floor plan 1330 through which the determined position of a particular device or object can be indicated, for example by visual indicator 1306. The device 1360 in this example may be the device at the position indicated by element 1306 or may be another device communicatively coupled to the indoor tracking system.

Figure 14A:
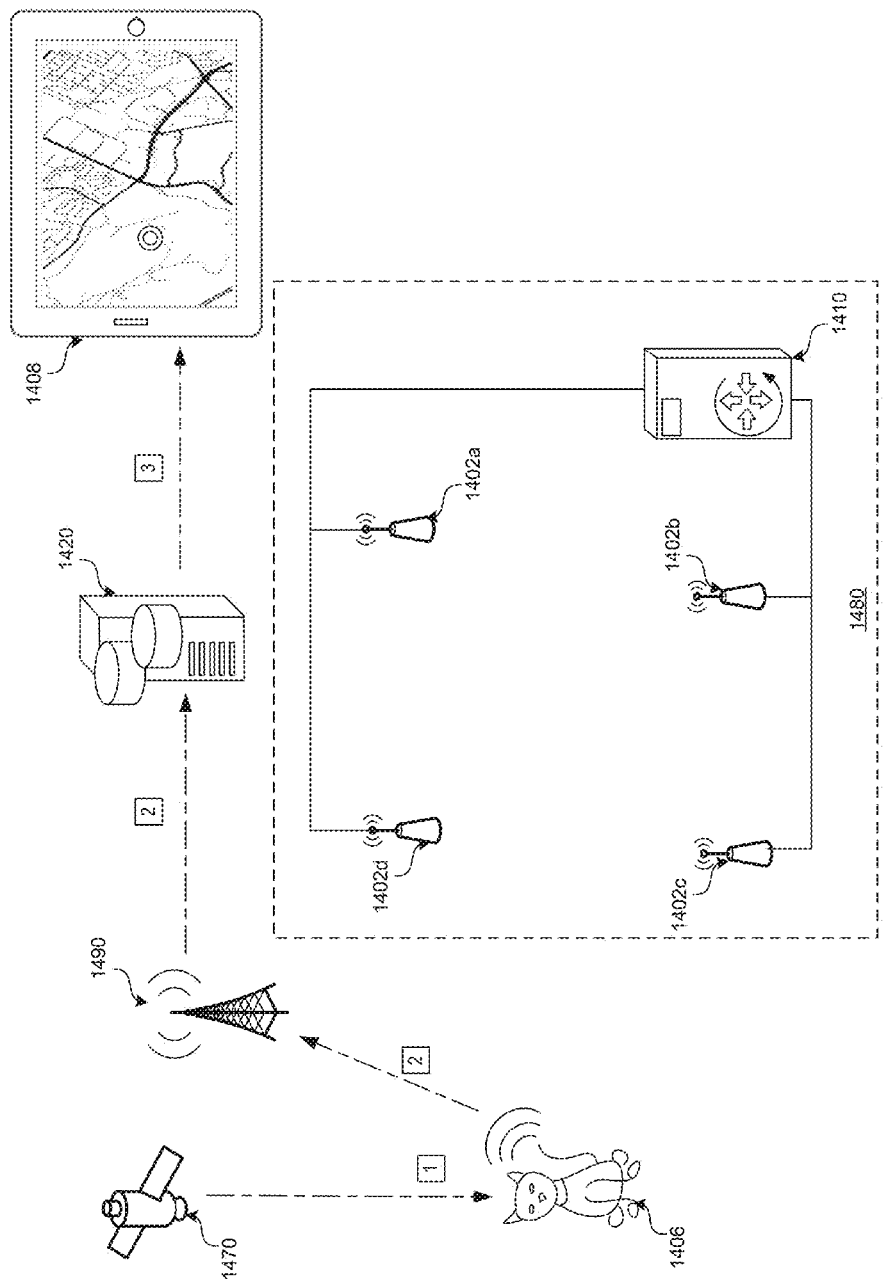
FIG. 14A is a diagram of an example system showing a process flow for tracking a pet that is located outdoors.
Figure 14B:
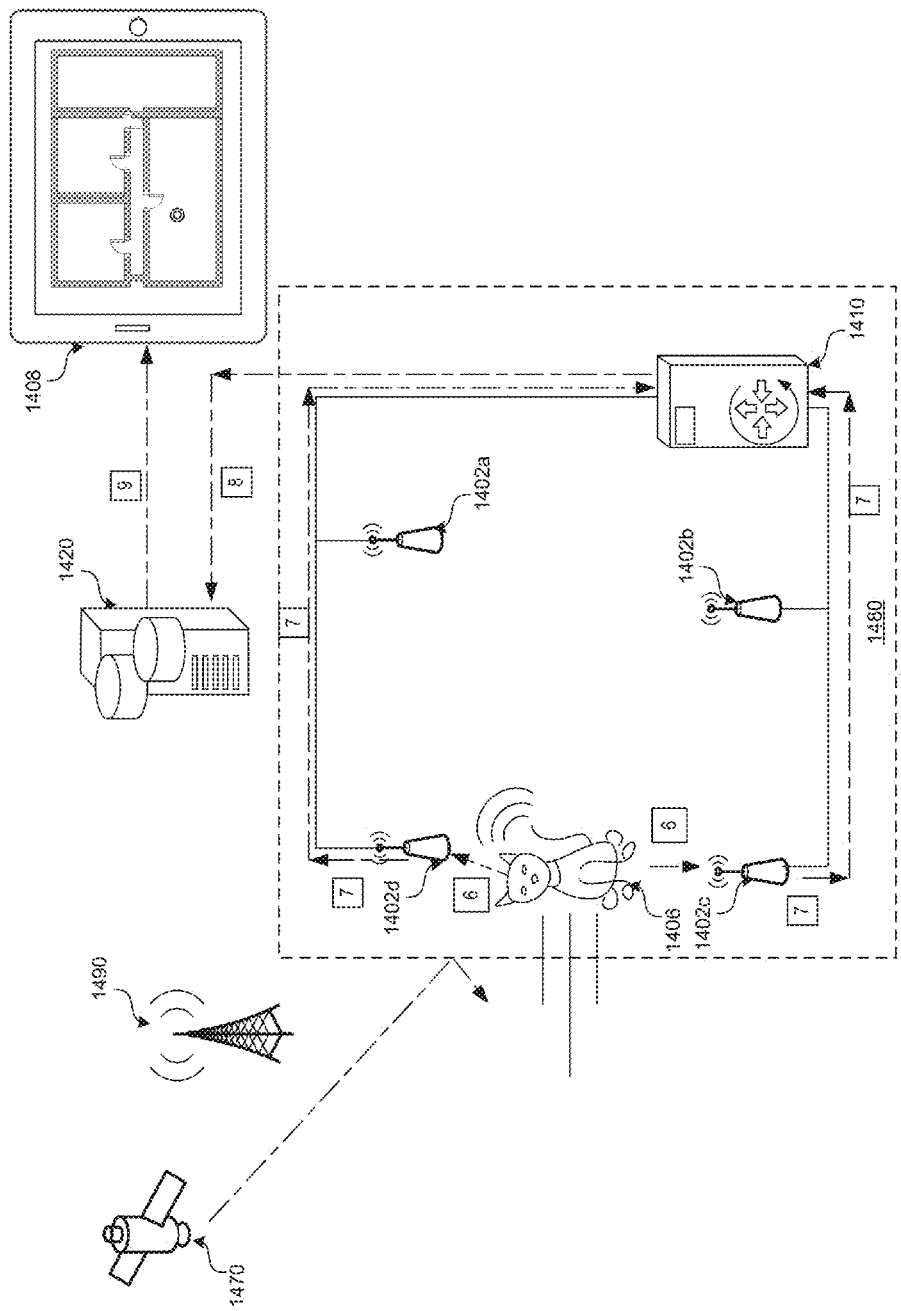
FIG. 14B is a diagram of the example system of FIG. 14A showing a process flow for tracking the pet when it is located indoors.

As previously mentioned, the techniques described herein for positioning and tracking can be applied in a number of different areas. FIGS. 14A-14B show an example process flow illustrating the application of such techniques in a particular area, namely pet tracking. Similar to the systems described with respect to FIGS. 11-12, the system described in FIGS. 14A-14B includes a multi-band wireless networking system formed of multiple nodes 1402*a*-*d* located within a building structure 1480. As previously discussed, indoor positioning and tracking may be enabled through the use of the multi-band wireless networking system. As further shown in FIGS. 14A-14B, positioning and tracking outside of the building structure 1480 may be handled by other systems such as a GPS system as indicated by satellite 1470.

FIG. 14A illustrates an example process flow for tracking a pet 1406 while the pet is outside of the building structure 1480 and therefore likely out of range of the nodes 1402*a*-*d* of the multiband wireless networking system. In the example depicted in FIG. 14A, the pet 1406 may include one or more devices to facilitate indoor and outdoor tracking. For example, the pet 1406 may have a collar including one or more of a GPS receiver, a cellular (e.g., LTE) transceiver, a WiFi transceiver, a Bluetooth transceiver, a BLE transceiver, and processing components. Alternatively, or in addition, one or more of these components may be incorporated into a chip implanted in the pet 1406.

In the example scenario depicted in FIG. 14A, the pet 1406 includes at least a GPS receiver for receiving signals from GPS satellites 1470 and a cellular transceiver for communicating via a cellular network while the pet 1406 is outside. Note that while the pet 1406 is outside unused components such as a Bluetooth transceiver may be automatically powered down to conserve energy.

As shown in FIG. 14A, at step 1, GPS signals from one or more GPS satellites 1470 are received by a device affixed to pet 1406 and are used to determine a position of the pet 1406. Note that although GPS is used as an example, any available positioning system may be utilized as well.

At step 2, the determined position of pet 1406 is transmitted a remote server 1420, for example, via a cellular network 1490. Again, although a cellular network is used as an example, any other available means for wireless communication may be utilized as well.

At step 3, the determined outdoor position of the pet 1406 is made accessible, for example by transmitting to a user device 1408. In this example, the user device 1408 may be operated by an owner of the pet 1406. Similar to as described with respect to FIG. 13, the location of the pet 1406 may be visually indicated via a display of the device 1408, for example, as a continually updated marker overlay on a visual map of the physical environment.

FIG. 14B shows a continuation of the scenario depicted in FIG. 14A at the point at which the pet 1406 enters the building structure 1480. In the scenario depicted in FIG. 14B, as the pet 1406 enters the building structure 1480 the signal from the GPS satellites 1470 may be come unreliable due to the interference of the materials forming the building structure 1480. Accordingly, in an embodiment the device affixed to the pet 1406 may at step 6 transmit a positioning signal (i.e., a request) that is received at one or more of the nodes 1402*a*-*d* of the multi-band wireless networking system within the structure 1480.

In some embodiments the positioning signal transmitted at step 6 may be triggered by the device at the pet 1406 in response to detecting poor GPS reception (i.e., that the received GPS signal is below a threshold signal strength). Alternatively, or in addition, the multi-band wireless network may detect the pet 1406 coming within range. For example, as the pet 1406 enters the building 1480 it comes within range of and is detected by one of the nodes 1402*c*-*d*, for example using BLE. In response to proximity detection, one or more of the nodes 1402*a*-*d* within range of the pet 1406 transmit a triggering signal that causes the device affixed to the pet 1406 to at step 6 transmit the positioning signal.

In some embodiments, to save power, the device affixed to the pet 1406 may power down unused systems such as the GPS receiver in response to detecting that the reception is poor and/or that indoor positioning has been taken over by the multi-band wireless networking system. Alternatively, or in addition, in response to detecting that the pet 1406 is within range of at least one of the nodes 1402*a*-*d*, the multi-band wireless networking system may transmit a signal to the device associated with the pet to power down unused systems such as GPS.

In any case, once inside, determining and tracking the position of the pet 1406 may be performed similar to as described with respect to FIGS. 11 and 12. For example, at step 7, the nodes 1402*c* and 1402*d* (i.e., those at which the position signal is received) forward the signal to a local aggregation server 1410, for example via a dedicated backhaul communication channel. At step 8, the aggregation server 1410 aggregates any information received from the one or more nodes 1402*a*-*d*, and forwards the aggregated information to a remote computation server 1420 for processing to determine a position of the pet 1406 based on the received information. Once the position is determined, at step 9 the computation server 1420 enables access to the determined position of the pet 1406 to other devices. For example, as shown in FIG. 14B, the computation server 1420 may transmit, via a computer network (e.g., the Internet) the determined position of the pet 1406 to the user device 1408. In this example, the user device 1408 may be operated by an owner of the pet 1406. The location of the pet 1406 may be visually indicated via a display of the device

1408, for example, as a continually updated marker overlay on a visual floor plan of the building structure 1480. In some embodiments, the computation server 1420 may instead transmit the determined position back to a device affixed to the pet 1406 which may then be made accessible, by the device affixed to pet 1406, to the user device 1408, for example via any computer network (e.g., the Internet).

In some embodiments, indoor tracking may involve device profiling, for example, to distinguish between multiple tracked devices and/or to track and predict patterns of movement. For example, Generic Attribute (GATT) profiles may be utilized to profile devices connecting to the multi-band wireless network.

Figure 15:
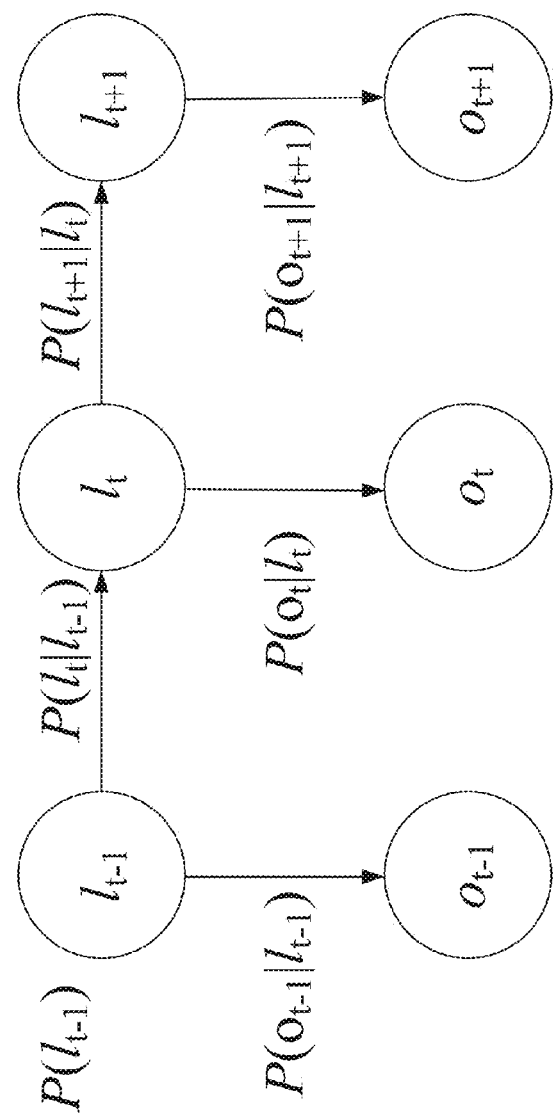
FIG. 15 shows an example of a first order HMM for modeling the movement of a device or other object.
Figure 16:
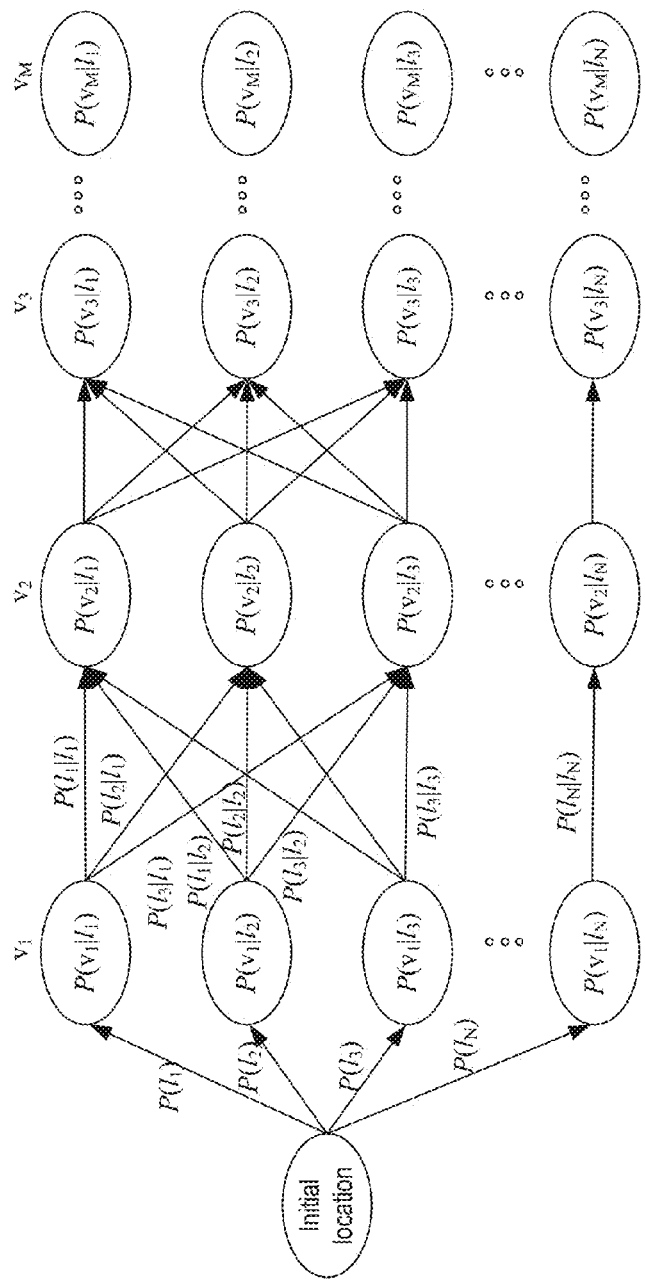
FIG. 16 shows an MINI model for coordination and time measurement synchronization among nodes in a multi-band wireless networking system.

An indoor tracking system may track profiled devices over time to recognize patterns of movement which can in turn be used to assist in future determining a current position. Machine learning can be applied in this context to assist in tracking and pattern recognition. For example, a Hidden Markov Model (HMM) to model movement of a tracked device or object. FIG. 15 shows an example of a first order MINI for modeling the movement of a device or other object. In the example depicted in FIG. 15, the term $l_t$ may represent a particular property and $O_t$ may represent RSSI or ToA. Machine learning may also be applied for coordination and time measurements. FIG. 16 shows an HMM model for coordination and time measurements. For example, given a set of RSSI variation trends, V=f $V_1, V_2, \ldots, V_M$ and a settled HMM, the hidden position sequence L =f $l_1, l_2, \ldots, l_N$ can be estimated by employing the Viterbi algorithm.

Example Computer Implementation

Figure 17:
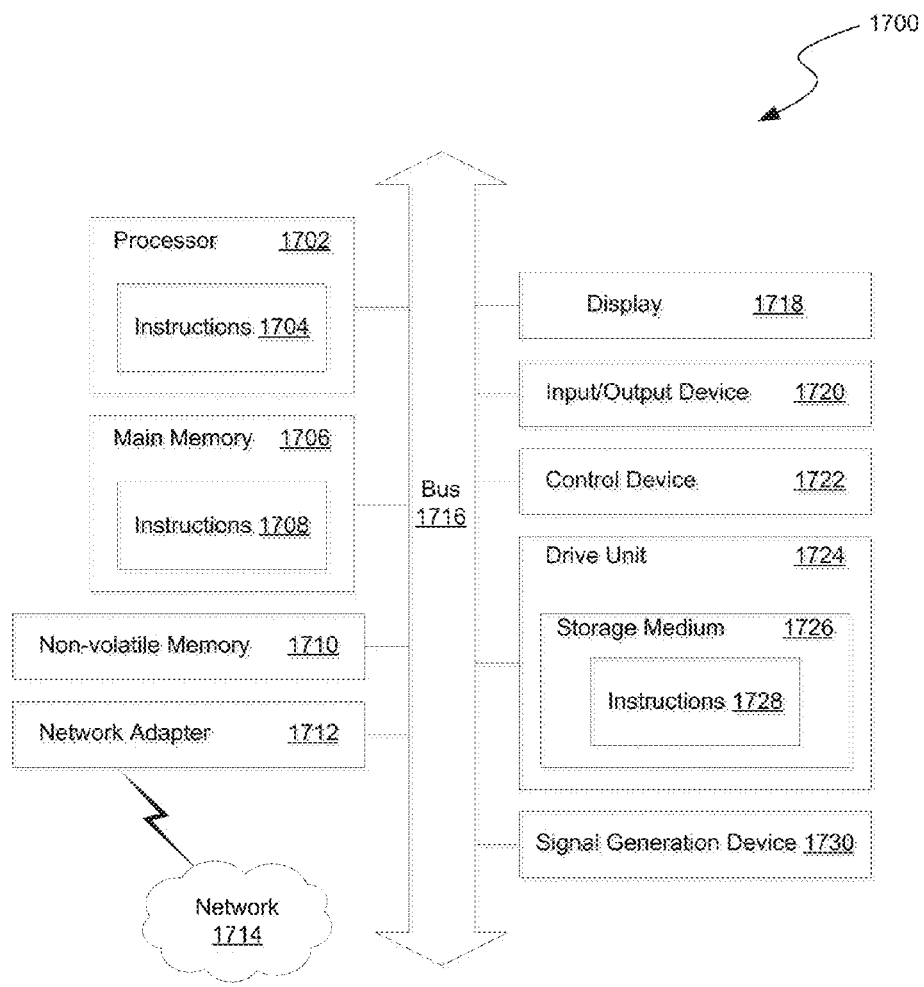
FIG. 17 is a diagram of an example of a processing system in which at least some operations described in this disclosure can be implemented.

FIG. 17 is a block diagram illustrating an example of a processing system 1700 in which at least some operations described in this disclosure can be implemented. The processing system 1700 may include one or more central processing units ("processors") 1702, main memory 1706, non-volatile memory 1710, network adapter 1712 (e.g., network interfaces), display 1718, input/output devices 1720, control device 1722 (e.g., keyboard and pointing devices), drive unit 1724 including a storage medium 1726, and signal generation device 1730 that are communicatively connected to a bus 1716. The bus 1716 is illustrated as an abstraction that represents any one or more separate physical buses, point to point connections, or both connected by appropriate bridges, adapters, or controllers. The bus 1716, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In various embodiments, the processing system 1700 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1706, non-volatile memory 1710, and storage medium 1726 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1728. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 1704, 1708, 1728) set at various times in various memory and storage devices in a computer, and that, when read and executed by one or more processing units or processors 1702, cause the processing system 1700 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1610, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1712 enables the processing system 1700 to mediate data in a network 1714 with an entity that is external to the processing system 1700, such as a network appliance, through any known and/or convenient communications protocol supported by the processing system 1700 and the external entity. The network adapter 1712 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1712 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   wirelessly interconnecting a plurality of wireless access points (AP) via a dedicated wireless channel that is dedicated for communication between the plurality of wireless APs, the plurality of wireless APs collectively forming a single multi-band wireless network providing broad coverage to a client device, each of the plurality of wireless APs including a first radio for communication, via the dedicated communication channel, with other APs of the plurality of wireless APs and a second radio for communication with the client device as part of the broad coverage provided to the client device;
   coordinating the plurality of wireless APs via the dedicated wireless communication channel;
   receiving, by a first wireless AP of the plurality of wireless APs, from each of the other wireless APs of the plurality of wireless APs, over the dedicated wireless communication channel, signals indicative of a position of the client device; and
   determining, by the first wireless AP, a position of the client device based on the received signals.

2. The method of claim 1, further comprising:
   tracking the position of the client device over a period of time.

3. The method of claim 1, wherein the multi-band wireless network comprises at least three wireless APs.

4. The method of claim 1, further comprising:
   receiving positioning data from the client device, the positioning data generated at the client device by a global positioning system (GPS) device;
   wherein the determined position of the device is further based on the positioning data received from the client device.

5. The method of claim 1, wherein the step of determining the position of the client device includes:
   transmitting, by the first wireless AP, information based on the received signals to a remote server computer communicatively coupled to the multi-band wireless network to determine the position of the client device.

6. The method of claim 1, wherein coordinating the plurality of wireless APs includes:
   coordinating time synchronization among the plurality of wireless APs via the dedicated wireless communication channel.

7. The method of claim 1, further comprising:
   transmitting, via the multi-band wireless network, to the client device, a signal indicative of the determined position of the client device.

8. The method of claim 1, further comprising:
   causing display, via a display device, of a visual indication of the determined position of the client device.

9. The method of claim 1, wherein signals received from at least one of the plurality of wireless APs are based on a wireless communication between the at least one wireless AP and the client device.

10. The method of claim 9, wherein the wireless communication is via any one or more of a WiFi, Bluetooth, or Bluetooth Low Energy (BLE) protocol.

11. The method of claim 1, wherein at least one of the received signals from the plurality of wireless APs is indicative of an estimated distance between the client device and a particular wireless AP, the distance estimated based on any of:
    a time of arrival (ToA) of a wireless communication between the client device and the particular wireless AP;
    a round trip time (RTT) of a wireless communication between the client device and the particular wireless AP; or
    a received signal strength (RSS) of a wireless communication between the client device and the particular wireless AP.

12. The method of claim 1, further comprising:
    causing each of the wireless APs to estimate a position of the client device;
    wherein the received signals from the plurality of wireless APs is indicative of the estimated position of the client device by each of the plurality of wireless APs.

13. The method of claim 1, further comprising:
    transmitting a request to the client device to broadcast a signal that is configured to be received at one or more of the plurality of wireless APs;
    wherein the received signals from the plurality of wireless APs are indicative of their receipt of the signal broadcast by the client device.

14. The method of claim 1, wherein the dedicated wireless communication channel is on the 5 GHz band.

15. The method of claim 1, wherein at least one of the plurality of wireless APs comprises:
    a 2.4 GHz radio;
    a 5 GHz low band radio; and
    a 5 GHz high band radio.

16. The method of claim 15, wherein the 5 GHz high band radio is dedicated for communication with other wireless APs via the dedicated wireless communication channel.

17. A system comprising:
    a multi-band wireless network configured to provide broad coverage to a client device, the multi-band wireless network comprising a plurality of wireless access points (APs) interconnected via a dedicated wireless communication channel that is dedicated for communication between the plurality of wireless networking devices, at least one of the plurality of wireless APs comprising:
    a first radio for communication, via the dedicated communication channel, with other APs of the plurality of APs;

a second radio for communication with the client device as part of the broad coverage provided to the client device;

a processor; and a memory communicatively coupled to the processor, the memory including instructions stored thereon, which when executed by the processor, cause the at least one wireless AP to:

coordinate with the other wireless APs via the dedicated wireless communication channel;

receive, from each of the other wireless APs, over the dedicated wireless communication channel, signals indicative of a position of the client device; and determine a position of the client device based on the received signals.

18. The system of claim 17, wherein the instructions to coordinate with the other wireless APs include instructions, which when executed by the processor, cause the at least one wireless AP to:

coordinate time synchronization with the other wireless APs.

19. The system of claim 17, wherein at least one of the received signals from the other wireless APs is indicative of an estimated distance between the client device and a particular wireless AP, the distance estimated based on any of:

a time of arrival (ToA) of a wireless communication between the client device and the particular wireless AP;

a round trip time (RTT) of a wireless communication between the client device and the particular wireless AP; or a received signal strength (RSS) of a wireless communication between the client device and the particular wireless AP.

20. A wireless access point (AP) configured to operate in conjunction with a plurality of other wireless APs in forming a single multiband wireless network providing broad coverage to a client device, the wireless AP comprising:

a first radio configured to communicate with the plurality of other wireless APs via a dedicated wireless communication channel;

a second radio configured to communicate with the client device as part of the broad coverage by the multi-band wireless network;

a processor; and a memory communicatively coupled to the processor, the memory including instructions stored thereon, which when executed by the processor cause the wireless AP to:

coordinate with the plurality of other wireless APs via the dedicated wireless communication channel;

receive, from each of the plurality of other wireless APs, over the dedicated wireless communication channel, signals indicative of a position of the client device; and determine a position of the client device based on the signals received from the plurality of other wireless APs.

* * * * *